US011687143B2

(12) United States Patent
Kim et al.

(10) Patent No.: US 11,687,143 B2
(45) Date of Patent: Jun. 27, 2023

(54) INTERFACE CIRCUIT FOR CONTROLLING OUTPUT IMPEDANCE OF A TRANSMISSION CIRCUIT AND AN IMAGE SENSOR INCLUDING IHE SAME

(71) Applicant: SAMSUNG ELECTRONICS CO., LTD., Suwon-si (KR)

(72) Inventors: Chaeryung Kim, Hwaseong-si (KR); Kiwoon Kim, Seoul (KR); Jiun Jeong, Hwaseong-si (KR); Hoyoung Kim, Seoul (KR); Dongjun Park, Suwon-si (KR); Dongyoung Song, Suwon-si (KR); Kyuik Cho, Hwaseong-si (KR); Gyeonghan Cha, Geoje-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/483,932

(22) Filed: Sep. 24, 2021

(65) Prior Publication Data

US 2022/0245084 A1 Aug. 4, 2022

(30) Foreign Application Priority Data

Feb. 3, 2021 (KR) .................. 10-2021-0015258

(51) Int. Cl.
*G06F 1/3234* (2019.01)
*G06F 13/40* (2006.01)
*G06F 1/26* (2006.01)

(52) U.S. Cl.
CPC ........ *G06F 1/3253* (2013.01); *G06F 13/4068* (2013.01); *G06F 13/4086* (2013.01); *G06F 1/266* (2013.01)

(58) Field of Classification Search
CPC .......... G06F 1/266; G06F 1/32; G06F 1/3206; G06F 1/3209; G06F 1/3253;
(Continued)

(56) References Cited

U.S. PATENT DOCUMENTS 6,356,106 B1 3/2002 Greeff et al.
7,945,793 B2 * 5/2011 Wilcox ................ G06F 1/3203
713/320

(Continued)

FOREIGN PATENT DOCUMENTS

KR 10-0389928 7/2003
KR 10-0469155 2/2005
KR 10-0480612 3/2005

OTHER PUBLICATIONS

"1A Peak Sink/Source PCDDR3 Termination Regulator with Integrated Isolation Switch and Low Power Mode Operation". TS3DDR32611. Aug. 2013. Texas Instruments Incorporated. (Year: 2013).*

(Continued)

*Primary Examiner* — Thomas J. Cleary
(74) *Attorney, Agent, or Firm* — F. Chau & Associates, LLC

(57) ABSTRACT

An interface circuit including: a first transmission circuit outputting a first signal to a transmission line via first transfer pads; and a second transmission circuit outputting a second signal to the transmission line via second transfer pads, the first transmission circuit includes a first termination resistor block including a switch and a first termination resistor connected between the first transfer pads, the second transmission circuit includes a second termination resistor block including a switch and a second termination resistor connected between the second transfer pads, and when the first transmission circuit outputs the first signal, the second termination resistor block detects the first signal, and when the first transmission circuit is in a low-power operation mode, the second termination resistor block disconnects the second termination resistor, and when the first transmission circuit is in a high-speed data transfer mode, the second (Continued)

termination resistor block connects the second termination resistor.

19 Claims, 19 Drawing Sheets

(58) Field of Classification Search
CPC .............. G06F 13/4063; G06F 13/4068; G06F 13/4086; G06F 1/1686; G06F 1/3215; G06F 1/3278; G06F 1/3287; H04N 5/268
See application file for complete search history.

(56) References Cited

U.S. PATENT DOCUMENTS

| | | | |
|---|---|---|---|
| 7,961,003 B2 | 6/2011 | Wilson | |
| 9,214,939 B2* | 12/2015 | Dietl | ................... G06F 13/4086 |
| 9,606,954 B2 | 3/2017 | Marena et al. | |
| 10,771,735 B2 | 9/2020 | Wen et al. | |
| 2002/0083255 A1 | 6/2002 | Greeff et al. | |
| 2003/0016550 A1 | 1/2003 | Yoo et al. | |
| 2005/0264316 A1* | 12/2005 | Atkinson | ............ G06F 13/4072 |
| | | | 326/30 |
| 2007/0023660 A1* | 2/2007 | Seger | ................... H04N 5/2256 |
| | | | 348/E5.029 |
| 2009/0300260 A1* | 12/2009 | Woo | ......................... E04B 2/58 |
| | | | 710/316 |
| 2010/0030934 A1* | 2/2010 | Bruennert | ........... G06F 13/4086 |
| | | | 710/305 |
| 2012/0215958 A1* | 8/2012 | Fai | ....................... G11C 7/1057 |
| | | | 710/316 |
| 2014/0156899 A1* | 6/2014 | Kristiansen | ......... G06F 13/4081 |
| | | | 710/305 |
| 2014/0270005 A1* | 9/2014 | Sengoku | ............. H04L 25/0272 |
| | | | 375/330 |
| 2015/0350595 A1* | 12/2015 | Chen | ..................... H04N 19/62 |
| | | | 348/724 |
| 2018/0342782 A1* | 11/2018 | Tai | ............................ H01P 5/12 |
| 2022/0264037 A1* | 8/2022 | Song | .................. H04N 5/23227 |

OTHER PUBLICATIONS

Schuler, Ray, et al. "High Speed Low Power RS485 Transceivers with Integrated Switchable Termination". Jun. 2006. Linear Technology Magazine. (Year: 2006).*

"Sony Develops the World's First*1 CMOS Image Sensor Capable of Multiple Sensor Connection to a Single MIPI Input Port*2 for Sensing Applications", Sony News Releases, 4 pages.

* cited by examiner

INTERFACE CIRCUIT FOR CONTROLLING OUTPUT IMPEDANCE OF A TRANSMISSION CIRCUIT AND AN IMAGE SENSOR INCLUDING THE SAME

CROSS TO REFERENCE TO RELATED APPLICATION(S)

This application claims priority under 35 U.S.C. § 119 to Korean Patent Application No. 10-2021-0015258 filed on Feb. 3, 2021 in the Korean Intellectual Property Office, the disclosure of which is incorporated by reference herein in its entirety.

TECHNICAL FIELD

Example embodiments of the present disclosure relate to an interface circuit and an image sensor including the same.

Discussion of Related Art

Integrated circuit chips included in an electronic device may exchange data with each other via an interface device. For example, two integrated circuit chips that communicate with each other may respectively include an interface device. As data processing capacity of an electronic device has increased, various standards for providing high-speed data communication between integrated circuit chips have been developed and/or suggested. To support impedance matching for accurate communication between integrated circuit chips, a termination circuit may be included in an interface device for receiving data. As the number of semiconductor devices connected to an electronic device increases, the semiconductor devices may share a transmission line to communicate with the integrated circuit chips. However, if impedance matching between the semiconductor devices and the integrated circuit chips is insufficient, high-speed data communication may not be accurately performed.

SUMMARY

An example embodiment of the present disclosure provides an interface circuit which may adjust an output impedance of a transmission circuit and an image sensor including the same.

According to an example embodiment of the present disclosure, there is provided an interface circuit including: a first transmission circuit configured to output a first signal to a transmission line via first transfer pads; and a second transmission circuit configured to output a second signal to the transmission line via second transfer pads, wherein the first transmission circuit includes a first termination resistor block including a first switch and a first termination resistor connected in series between the first transfer pads, wherein the second transmission circuit includes a second termination resistor block including a second switch and a second termination resistor connected in series between the second transfer pads, and wherein, when the first transmission circuit outputs the first signal, the second termination resistor block detects the first signal, and when the first transmission circuit is detected to be in a low-power operation mode, the second termination resistor block disconnects the second termination resistor between the second transfer pads, and when the first transmission circuit is detected to be in a high-speed data transfer mode, the second termination resistor block connects the second termination resistor between the second transfer pads.

According to an example embodiment of the present disclosure, there is provided an interface circuit including a first transmission circuit for transmitting a differential signal to a transmission line via transfer pads, the interface circuit including: transmitters configured to output the differential signal; and a termination resistor block connected between the transfer pads and configured to adjust an output impedance of a second transmission circuit connected to the transmission line, wherein the termination resistor block detects a low-power signal sequence output by the first transmission circuit, and adjusts the output impedance of the second transmission circuit in response to the low-power signal sequence.

According to an example embodiment of the present disclosure, there is provided an interface circuit including a first transmission circuit for transmitting a signal to a transmission line via transfer pads, the interface circuit including: transmitters configured to output the signal; and a termination resistor block connected between the transfer pads, wherein, when the first transmission circuit is in a low-power operation mode, an output impedance of a second transmission circuit connected to the transmission line has a high impedance, and when the first transmission circuit is in a high-speed data transmission mode, the termination resistor block determines the output impedance of the second transmission circuit to be a designated impedance different from the high impedance.

According to an example embodiment of the present disclosure, there is provided an image sensor including: a pixel array including pixels; a logic circuit configured to generate image data by processing signals output by the pixels; and an interface circuit including a first transmission circuit for transmitting the image data to a transmission line via transfer pads, wherein the interface circuit includes: transmitters configured to output the image data; and a termination resistor block connected between the transfer pads and configured to adjust an output impedance of the first transmission circuit, and wherein the termination resistor block detects a low-power signal sequence output by a second transmission circuit of another image sensor connected to the transmission line, and adjusts the output impedance of the first transmission circuit in response to the low-power signal sequence.

BRIEF DESCRIPTION OF DRAWINGS

The above and other features of the present disclosure will be more clearly understood from the following detailed description, taken in conjunction with the accompanying drawings, in which.

DETAILED DESCRIPTION OF THE EMBODIMENTS

Hereinafter, example embodiments of the present disclosure will be described with reference to the accompanying drawings.

Figure 1:
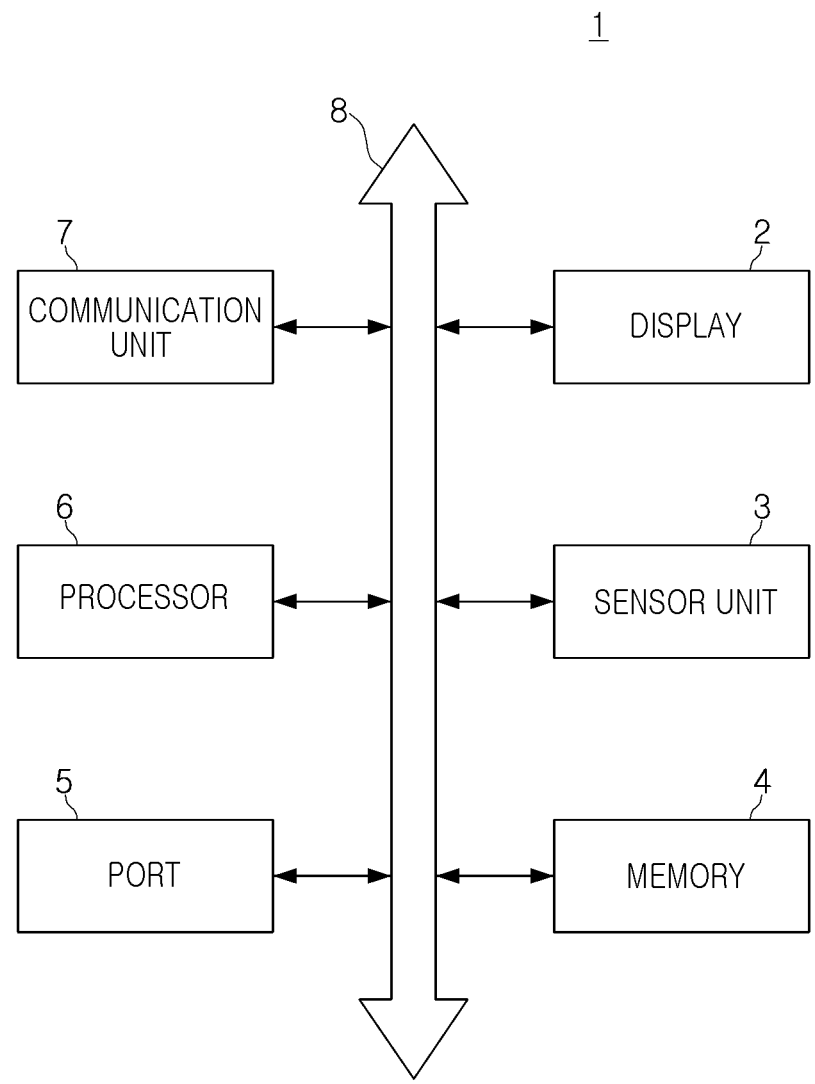
FIG. 1 is a block diagram illustrating an electronic device according to an example embodiment of the present disclosure.

FIG. 1 is a block diagram illustrating an electronic device according to an example embodiment of the present disclosure.

Referring to FIG. 1, an electronic device 1 in an example embodiment of the present disclosure may include a display 2, a sensor unit 3, a memory 4, a port 5, a processor 6, and a communication unit 7. In addition, the electronic device 1 may further include a camera, a wired/wireless communication device, and a power device.

The port 5 may be provided for the electronic device 1 to communicate with external devices. The electronic device 1 may be a mobile device such as a smartphone or a tablet personal computer (PC), and may include various other devices including a camera.

The display 2 may be configured to output a screen, and may be implemented as a liquid crystal display (LCD), an organic light emitting diode (OLED) display, an electronic paper display, or a microelectromechanical system (MEMS) display.

Overall operations of the electronic device 1 may be controlled by the processor 6. The processor 6 may perform specific operations, instructions, and tasks. The processor 6 may be implemented as a central processing unit (CPU), a microprocessor unit (MCU), a system on a chip (SoC), or an application processor (AP). In an example embodiment of the present disclosure, when the electronic device 1 is implemented as a tablet PC or a smartphone, the processor 6 may be implemented as an application processor (AP), and when the electronic device 1 is implemented as a laptop computer or a desktop computer, the processor 6 may be implemented as a CPU. The processor 6 may communicate with the display 2, the sensor unit 3, the memory 4, and other devices connected to the port 5, via a bus 8.

The memory 4 may be configured as a storage medium for storing data required for operation of the electronic device 1 or multimedia data. The memory 4 may include a volatile memory such as a random access memory (RAM), or a non-volatile memory such as a flash memory. In addition, the memory 4 may include at least one of a solid state drive (SSD), a hard disk drive (HDD), and an optical drive (ODD) as a storage device.

The sensor unit 3 may include various sensors for collecting information on surroundings, and may include, for example, an acoustic sensor, an image sensor, a global positioning system (GPS) sensor, and the like. The image sensor may be configured to obtain an image and may include a complementary metal oxide semiconductor (CMOS) image sensor or a charge-coupled device (CCD) image sensor.

The communication unit 7 may be configured to mediate communications between the electronic device 1 and external electronic devices. The communication unit 7 may exchange data with external electronic devices through various communication interfaces, such as, for example, wired communication interfaces such as universal serial bus (USB), local area network (LAN), micro-USB, or the like, or wireless communication interfaces such as Bluetooth, near field communication (NFC), infrared communication, and visible light communication.

Each of the elements 2-7 included in the electronic device 1 may communicate via the bus 8. Each of the elements 2-7 included in the electronic device 1 may exchange data in accordance with various communication standards. In an example embodiment of the present disclosure, when the electronic device 1 is a mobile device, each of the elements 2-7 may exchange data with each other in accordance with a communication standard prescribed by the mobile industry processor interface (MIPI) standard.

The display 2, the sensor unit 3, and the processor 6 may include an interface circuit for exchanging data with each other. The interface circuit may, include at least one of a transmission circuit for transmitting data and a reception circuit for receiving data. For example, the interface circuit may include a transceiver. The interface circuit may support communication in accordance with at least one of a D-PHY interface and a C-PHY interface prescribed by the MIPI standard. Each of the D-PHY interface and the C-PHY interface may transmit data in different ways, and the number and arrangement of pads required to transmit data via these interfaces may be different.

The MIPI D-PHY may be a high-speed digital serial interface. When communication is performed in accordance with the MIPI D-PHY interface, the interface circuit on the transmitting, side may separately transmit a signal including data to be transmitted and a clock signal, and the interface circuit on the receiving side may process the received signal by a differential signal method and may restore the data.

It is assumed that the interface circuit may be defined based on the D-PHY specification, although it is not limited thereto. Further, the data may be a unidirectional or a bi-directional signal, but in the present embodiment, it is assumed that the data may be a unidirectional serial signal transmitted from the transmission circuit to the reception circuit.

The number of camera modules connected to the electronic device 1 may be increased. When the sensor unit 3 is implemented as an image sensor, the number of sensor units 3 may increase as the number of camera modules increases. When the number of sensor units 3 increases, the number of reception circuits of the processor 6 which may receive data from the transmission circuit included in the sensor unit 3 may also increase. The transmission line between the transmission circuit of the sensor unit 3 and the reception circuit of the processor 6 may be formed in a pattern of a printed circuit board (PCB), and the transmission line may be connected to the reception circuit of the processor 6 via reception pads or reception pins of the processor 6. When the number of reception circuits of the processor 6 increases, the number of reception pins of the processor 6 may increase.

In an example embodiment of the present disclosure, the plurality of sensor units 3 may share a transmission line. Accordingly, even when the number of camera modules connected to the electronic device 1 increases, the number of reception circuits, the number of transmission lines, and the number of reception pins of the processor 6 may be significantly reduced. Accordingly, a chip layout may be reduced, cost of implementing the circuit may be lowered, and a size of the product may be reduced. In addition, since only a single image sensor needs to transmit data at a time, an image sensor not transmitting data may be used to adjust the output impedance of the transmission circuit. Accordingly, signal deterioration may be reduced, and high-speed data communication may be provided.

Figure 2:
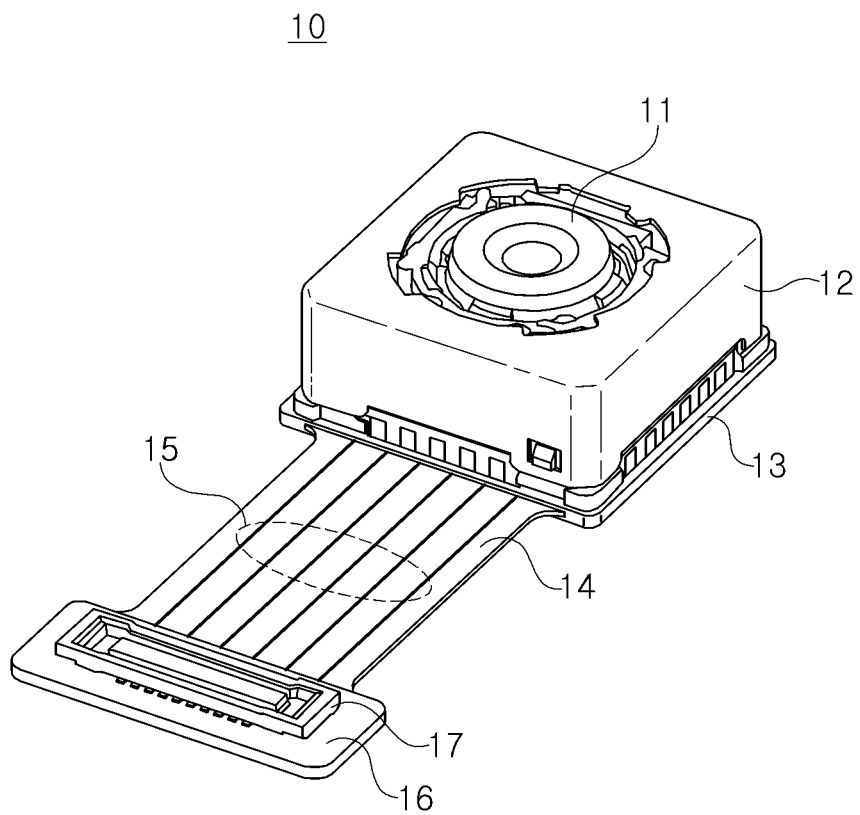
FIG. 2 is a diagram illustrating a camera module including an image sensor according to an example embodiment of the present disclosure.

FIG. 2 is a diagram illustrating a camera module including an image sensor according to an example embodiment of the present disclosure.

The camera module 10 in an example embodiment of the present disclosure may include an image sensor for generating image data by imaging a subject. The camera module 10 may, include an optical unit 11, a housing 12 for accommodating the optical unit 11 and an image sensor, a circuit board 13 on which the image sensor is mounted, and a connector 17. The exterior of the camera module 10 may not be limited to the example embodiment illustrated in FIG. 2.

The optical unit 11 may include at least one or more lenses for collecting light for imaging a subject. The image sensor may focus on a subject by moving the lens included in the optical unit 11, and the lens may be moved by an auto focus (AF) generator installed in the housing 12.

The image sensor may be disposed below the optical unit 11 and may be mounted on the circuit board 13. The image sensor may include a plurality of pixels, and a logic circuit for generating image data using an electrical signal output by the plurality of pixels. Each of the plurality of pixels may include a photoelectric device for generating electric charges in response to light, and a pixel circuit for converting electric charges generated by the photoelectric device into an electric signal. In an example embodiment of the present disclosure, the image sensor may include a memory connected to a logic circuit and storing image data.

The connector 17 may provide a connection with an external processor. In example embodiments of the present disclosure, the camera module 10 may further include an image processor including a circuit for processing image data. The camera module 10 may exchange data with an external device such as a CPU, an AP and a display driving device via the connector 17.

The camera module 10 may further include a flexible printed circuit board 14 electrically connected to the circuit board 13 and including a wiring 15 for connecting the image sensor to an external device, and a board 16 on which the connector 17 is mounted.

The camera module 10 may exchange data with an external device via a predetermined interface. For example, the camera module 10 may exchange data with an external device according to one of a D-PHY interface and a C-PHY interface prescribed by the mobile industry processor interface (MIPI) standard.

As the number of camera modules 10 connected to the electronic device increases, the number of reception circuits of an external processor connected to the camera module 10 may increase. The camera module 10 and the processor may be connected to each other through a transmission line. In an example embodiment of the present disclosure, camera modules connected to the electronic device may share a transmission line. Accordingly, even when the number of camera modules 10 connected to the electronic device increases, the number of transmission lines and the number of reception circuits of the processor may be significantly reduced. In addition, since only a single image sensor needs to transmit data at a time, the output impedance of an image sensor not transmitting data may be adjusted, thereby reducing signal deterioration.

Figure 3:
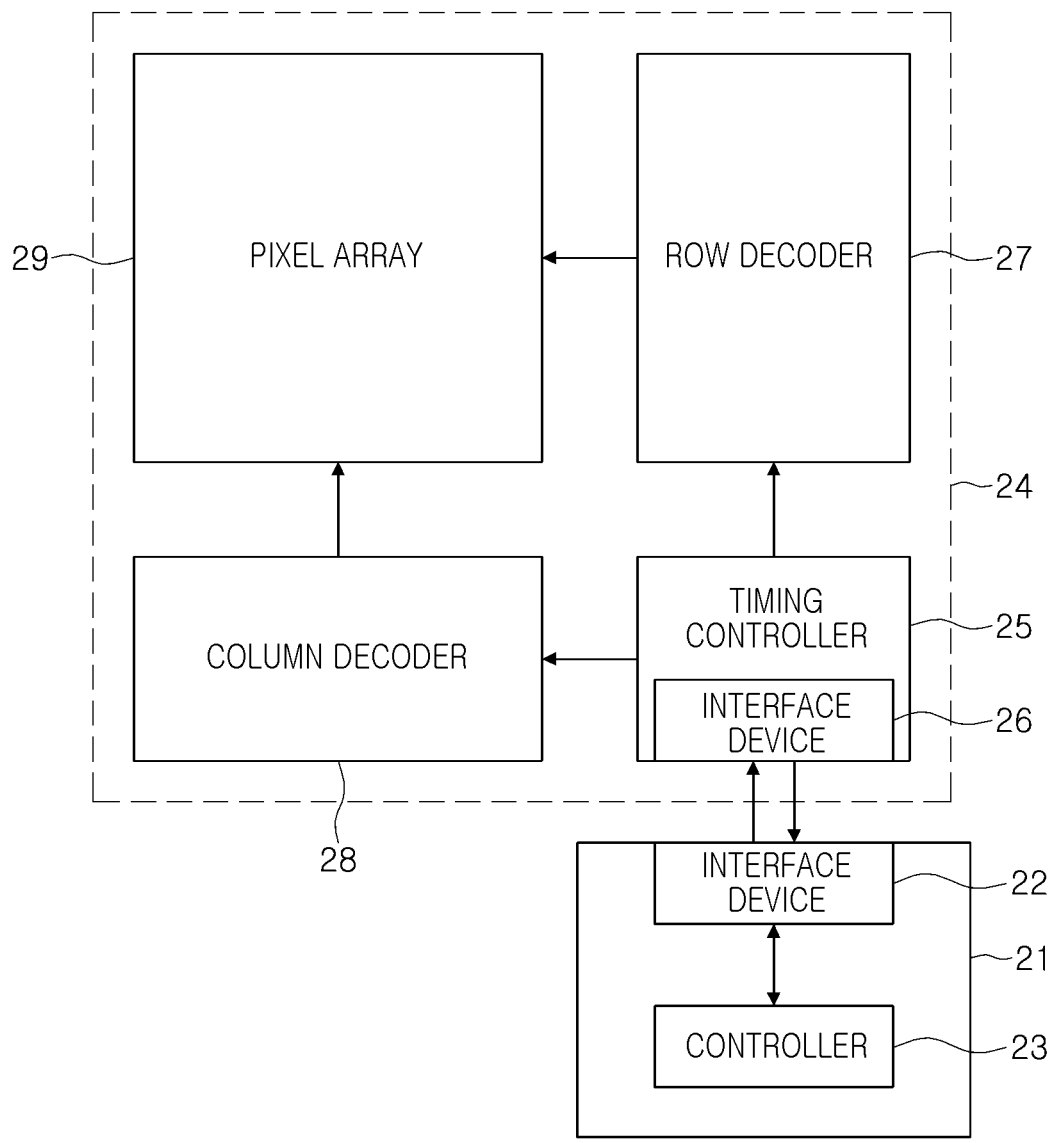
FIG. 3 is a diagram illustrating data communication of an electronic device according to an example embodiment of the present disclosure.

FIG. 3 is a diagram illustrating data communication of an electronic device according to an example embodiment of the present disclosure. Referring to FIG. 3, an electronic device 20 may include an application processor 21 and an image sensor 24. The image sensor 24 may include a timing controller 25, a row decoder 27, a column decoder 28, and a pixel array 29. The timing controller 25, the row decoder 27, and the column decoder 28 may be logic circuits for controlling the pixel array 29. The pixel array 29 may have a plurality of pixels, and the timing controller 25 may control an operation of the row decoder 27 and the column decoder 28, and may process signals output by the pixels, thereby generating image data.

The timing controller 25 may include an interface device 26 for mediating communication with the application processor 21, and the interface device 26 may exchange data with the application processor 21 in accordance with the communication standard prescribed by the MIPI standard. For example, the interface device 26 may support communication in accordance with at least one of a D-PHY interface and a C-PHY interface prescribed by the MIPI standard.

The application processor 21 may include a controller 23 and an interface device 22. In an example embodiment of the present disclosure, the controller 23 may include a control logic for controlling overall operations of the application processor 21. The application processor 21 may exchange data with the image sensor 24, and the controller 23 may receive image data generated by the image sensor 24 via the interface device 22.

The application processor 21 and the image sensor 24 may be connected to each other via a transmission line. Each of the interface devices 22 and 26 may include a transmission circuit and a reception circuit. When the number of the image sensors 24 communicating with the application processor 21 increases, the number of reception circuits included in the interface device 22 of the application processor 21 may increase.

In an example embodiment of the present disclosure, the plurality of image sensors may share a transmission line to communicate with the application processor 21. In this case, since only a single image sensor needs to transmit data at a time, an image sensor not transmitting data may adjust an output impedance of the transmission circuit. Accordingly, a size of the product may be reduced, signal deterioration may be reduced, and high-speed data communication may be provided.

Figure 4:
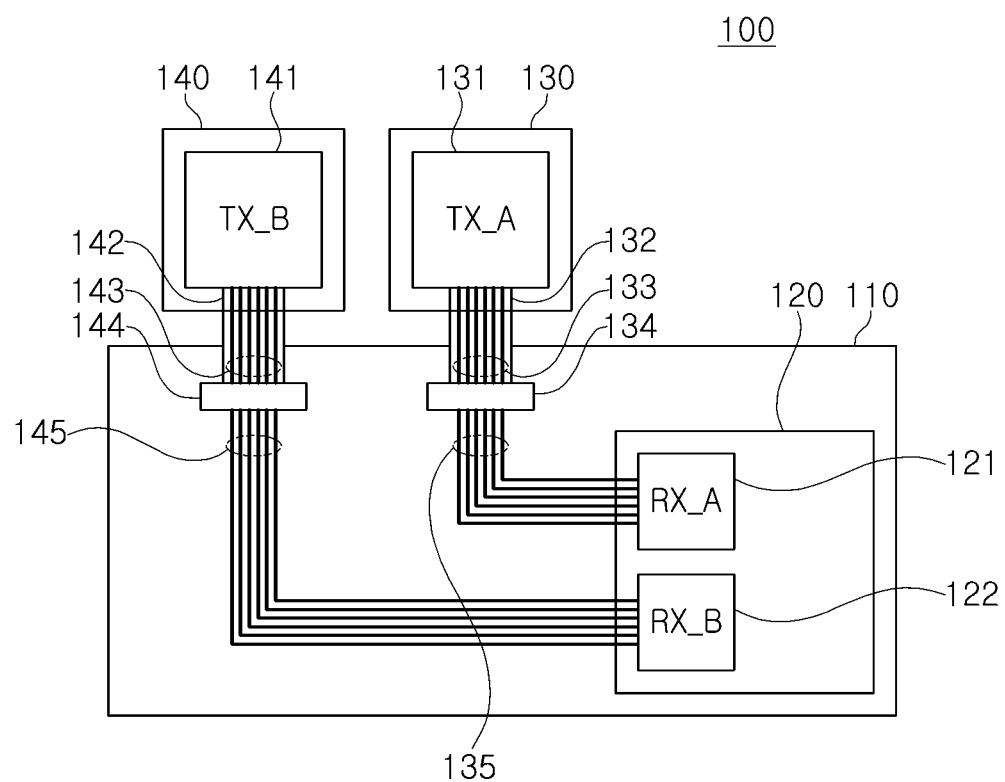
FIGS. 4 and 5 are block diagrams illustrating a comparative example of an electronic device according to an example embodiment of the present disclosure.
Figure 5:
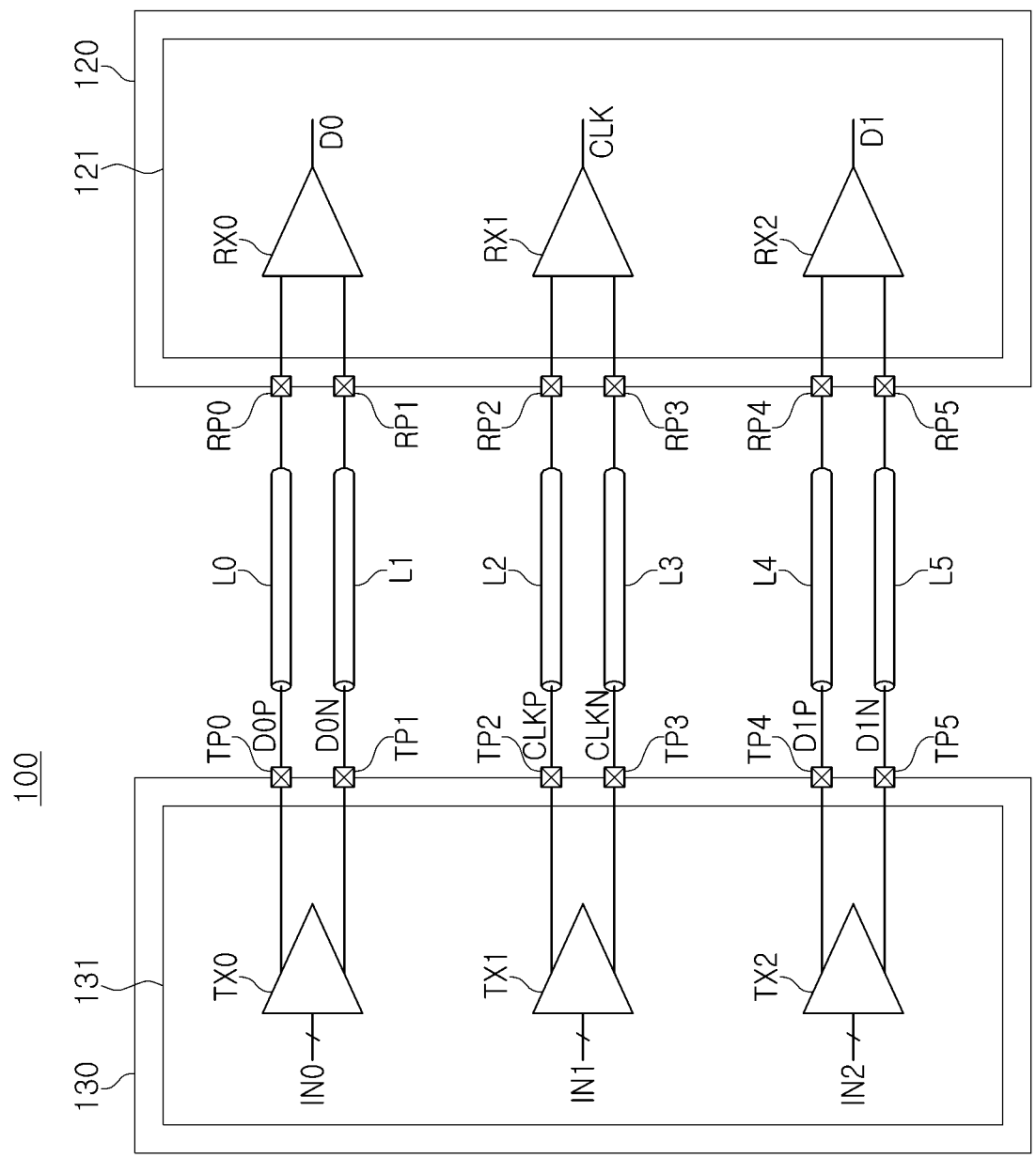

FIGS. 4 and 5 are block diagrams illustrating a comparative example of an electronic device according to an example embodiment of the present disclosure.

Referring to FIG. 4, an electronic device 100 may include an AP 120 mounted on an PCB 110, a first image sensor 130 electrically connected to the PCB 110 via a first connector 134, and a second image sensor 140 electrically connected to the PCB 110 via a second connector 144. The first image sensor 130 and the second image sensor 140 may be included in different camera modules.

The first image sensor 130 may exchange data with the AP 120 via the first connector 134, and the second image sensor 140 may exchange data with the AP 120 via the second connector 144. The first image sensor 130 may include a first transmission circuit 131, and the second image sensor 140 may include a second transmission circuit 141. When the AP 120 is connected to the first connector 134, the first transmission circuit 131 may exchange data with the AP 120 via a wiring 133 and the first connector 134 included in a circuit board 132. When the AP 120 is connected to the second connector 144, the second transmission circuit 141 may exchange data with the AP 120 via a wiring 143 and the second connector 144 included in a circuit board 142.

The AP 120 may include a first reception circuit 121 and a second reception circuit 122. A first transmission line 135 and a second transmission line 145 may be formed in a pattern on the PCB 110. The first image sensor 130 may exchange data with the AP 120 via the first transmission line 135, and the second image sensor 140 may exchange data with the AP 120 via the second transmission line 145. The AP 120 and the first and second image sensors 130 and 140 may be connected by a point-to-point method is the first transmission line 135 and the second transmission line 145. Each of the first transmission line 135 and the second transmission line 145 may include a single clock lane and one or more data lanes.

By the point-to-point coupling, impedance matching among output impedance of the transmission circuit, a characteristic impedance of the transmission line, and input impedance of the reception circuit may be sufficiently carried out. When the impedance matching is sufficiently carried out, distortion of the signal waveform may be reduced and reflected wave(s) may be eliminated. However, when the number of camera modules connected to the electronic device 100 increases in the point-to-point coupling, the number of patterns on the PCB 110 forming a transmission line and the number of the reception circuits included in the AP 120 may increase.

FIG. 5 may be a diagram illustrating operation of an interface for outputting image data and a clock signal by a differential signal method, such as a D-PHY interface in accordance with the MIPI standard, for example.

Referring to FIG. 5, an electronic device 100 may include an AP 120 and an image sensor 130. The AP 120 may include a reception circuit 121, and the image sensor 130 may include a transmission circuit 131. The reception circuit 121 may include a plurality of receivers RX0, RX1 and RX2, and the transmission circuit 131 may include a plurality of transmitters TX0, TX1 and TX2.

The plurality of transmitters TX0-TX2 may output differential signals, which may be image data D0P, D0N, D1P, and D1N and clock signals CLKP and CLKN, in response to input signals IN0, IN1 and IN2. The plurality of transmitters TX0-TX2 may output the differential signals to transmission lines L0, L1, L2, L3, L4 and L5 via a plurality of transfer pads TP0, TP1, TP2, TP3, TP4 and TP5. The transfer pads TP0-TP5 may be connected to a plurality of reception pads RP0, RP1, RP2, RP3, RP4 and RP5 via a single clock lane and one or more data lanes. For example, the transmission lines L0 and L1 may be referred to as a first data lane, the transmission lines L4 and L5 may be referred to as a second data lane, and the transmission lines L2 and L3 may be referred to as a clock lane.

The reception pads RP0-RP5 may be connected to the plurality of receivers RX0-RX2. For example, the reception pads RP0-RP5 may be pads provided on a main board on which a processor is mounted. Each of the receivers RX0-RX2 may be connected to a pair of the reception pads RP0-RP5 and may generate data D0 and D1 and a clock signal CLK by a differential signal method. For example, the receiver RX0 may generate the data D0, the receiver RX1 may generate the clock signal CLK and the receiver RX1 may generate the data D1. In the example embodiment illustrated in FIG. 5, six transfer pads TP0-TP5, three lanes, and six reception pads RP0-RP5 may be required to transmit image data by a differential signal method.

The number of camera modules connected to the electronic device 100 may increase. For example, when three camera modules and four data lanes are provided, the AP 120 may require three reception circuits, and may require 30 transfer pads and 30 reception pads. In addition, 30 patterns on the PCB for forming the transmission line may also be required.

In an example embodiment of the present disclosure, image sensors included in the camera modules may share a transmission line to communicate with the AP 120. The image sensors may share a transmission line with each other by a multi-drop method and may be connected to the AP 120. Accordingly, by using the multi-drop method, even when the number of camera modules connected to the electronic device 100 increases, the number of reception circuits, the number of transmission lines, and the number of reception pads of the AP 120 may be significantly reduced.

By the multi-drop method, only a single image sensor may need to transmit data to the AP 120 at a time. Therefore, an image sensor not transmitting data may need to be in a high impedance (Hi-impedance or Hi-Z) state. In this case, a transmission line connected to the image sensor not transmitting data may be stubbed, such that signal deterioration may occur due to reflection of the signal. In addition, to support impedance matching, a resistor may be connected to an output terminal of the image sensor not transmitting data. In this case, signal distortion may occur when the image sensor in operation is in a low-power operation mode.

In an example embodiment of the present disclosure, an image sensor not transmitting data may adjust an output impedance of the transmission circuit. Accordingly, signal deterioration may be reduced, and high-speed data communication may be provided.

Figure 6:
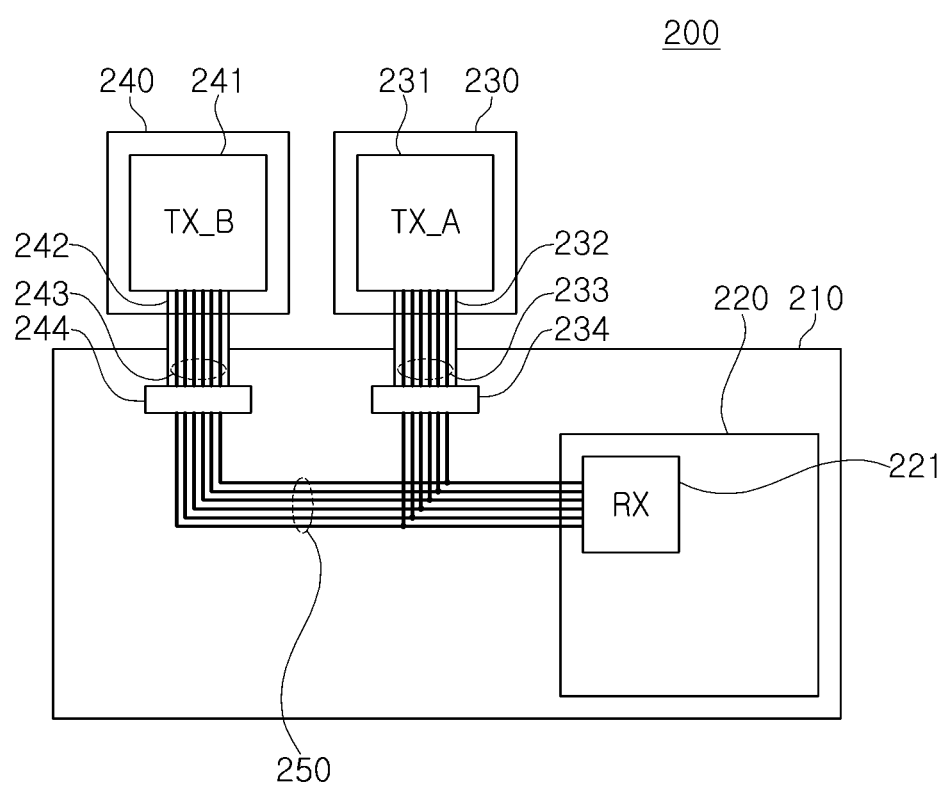
FIG. 6 is a block diagram illustrating an electronic device according to an example embodiment of the present disclosure.

FIG. 6 is a block diagram illustrating an electronic device according to an example embodiment of the present disclosure.

Referring to FIG. 6, an electronic device 200 may include an AP 220 mounted on a PCB 210, a first image sensor 230 electrically connected to the PCB 210 via a first connector 234, and a second image sensor 240 electrically connected to the PCB 210 via a second connector 244.

The first image sensor 230 may exchange data with the AP 220 via the first connector 234, and the second image sensor 240 may exchange data with the AP 220 via the second connector 244. The first image sensor 230 may include a first transmission circuit 231, and the second image sensor 240 may include a second transmission circuit 241. When the AP 220 is connected to the first connector 234, the first transmission circuit 231 may exchange data with the AP 220 via a wiring 233 and a first connector 234 included in a circuit board 232. When the AP 220 is connected to the second connector 244, the second transmission circuit 241 may exchange data with the AP 120 via wiring 243 and the second connector 244 included in a circuit board 242.

The AP 220 may include a single reception circuit 221. The transmission line 250 may be formed in a pattern on the PCB 210. The first and second image sensors 230 and 240 may share a transmission line 250 by a multi-drop method and may communicate with the AP 220. The electronic device 200 may allow only a single image sensor to transmit image data to the AP 220 at a time. The image data may include a plurality of pieces of frame data, and each frame data ma include M (e.g., an integer equal to or greater than two) number of pieces of line data. Each line data may include a plurality of pixel data. For example, the first image sensor 230 and the second image sensor 240 may alternately transmit the line data or may alternately transmit the frame data.

In an example embodiment of the present disclosure, the first image sensor 230 and the second image sensor 240 may be connected by a multi-drop method. Accordingly, even when the number of camera modules connected to the electronic device 200 increases, the number of reception circuits and the number of transmission lines 250 of the AP 220 may be significantly reduced.

In the multi-drop method, since only a single image sensor needs to transmit data to the AP, the transmission circuit of the image sensor not transmitting data nay have a high impedance state. In this case, signal deterioration may increase, such that data transmission speed may be limited. To support impedance matching, resistors may be connected to output terminals of the transmission circuits of all image sensors. In this case, signal distortion may occur when the image sensor in operation is in a low-power operation mode.

In an example embodiment of the present disclosure, the image sensor may include a termination resistor block for adjusting an output impedance of the transmission circuit. For example, when a transmission circuit of an image sensor transmitting data is in a low-power operation mode, a transmission circuit of an image sensor not transmitting data may have a high impedance state. When the transmission circuit of the image sensor transmitting data is in a high-speed data transmission mode, the transmission circuit of the image sensor not transmitting data may have a designated output impedance. Accordingly, the electronic device in an example embodiment of the present disclosure may reduce signal deterioration in the multi-drop method and may provide high-speed data communication.

FIGS. 7A, 7B, 8A and 8B are block diagrams illustrating an operating method of an interface circuit according to an example embodiment of the present disclosure.

Figure 7A:
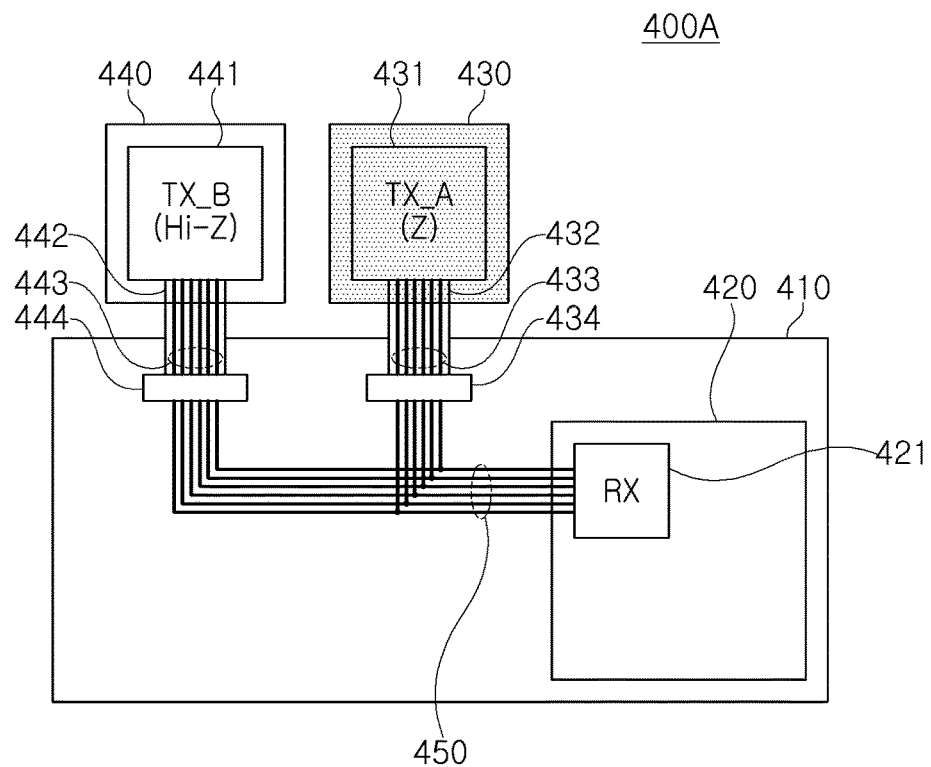
FIGS. 7A, 7B, 8A and 8B are block diagrams illustrating an operating method of an interface circuit according to an example embodiment of the present disclosure.
Figure 7B:
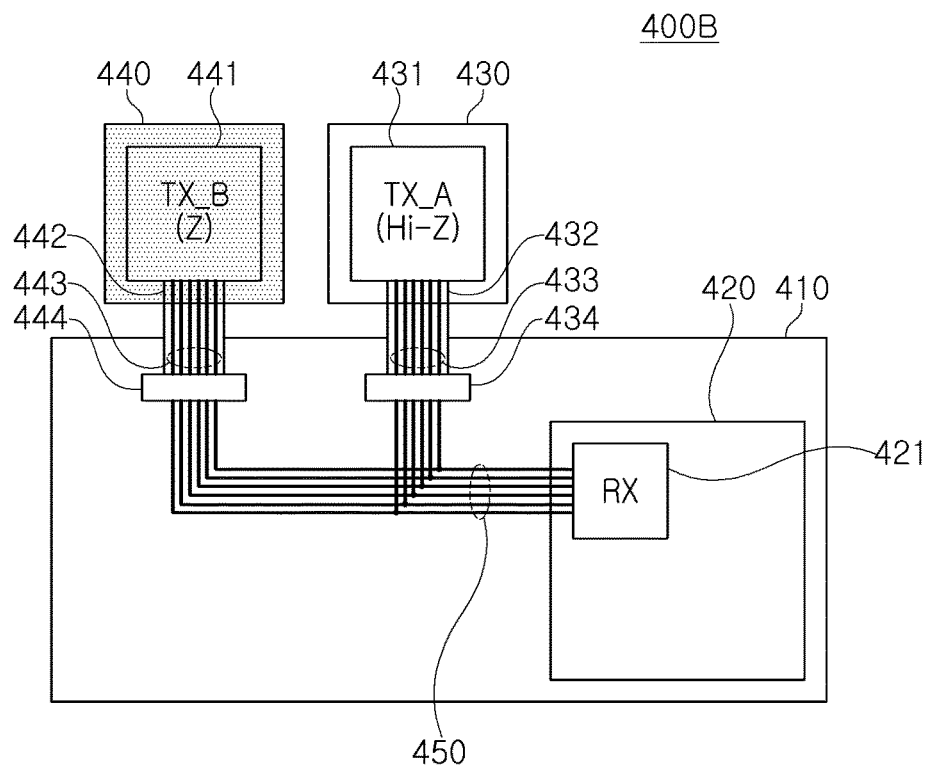

Referring to FIGS. 7A and 7B, electronic devices 400A and 400B may include a single processor 420 and two image sensors 430 and 440. The first image sensor 430 may include a first transmission circuit 431, and the first transmission circuit 431 may include a first termination resistor block for adjusting an output impedance. The second image sensor 440 may include a second transmission circuit 441, and the second transmission circuit 441 may include a second termination resistor block for adjusting an output impedance.

As illustrated in FIG. 7A, when the first image sensor 430 transmits data to the processor 420, the second image sensor 440 may not transmit data. When the first transmission circuit 431 of the first image sensor 430 is in a low-power operation mode, the second transmission circuit 441 of the second image sensor 440 may have a high impedance state. In other words, when the first transmission circuit 431 is in a first mode, the second transmission circuit 441 may have a high impedance state.

Alternatively, as illustrated in FIG. 7B, when the second image sensor 440 transmits data to the processor 420, the first image sensor 430 may not transmit data. When the second transmission circuit 441 of the second image sensor 440 is in a low-power operation mode, the first transmission circuit 431 of the first image sensor 430 may have a high impedance state. In other words, when the second transmission circuit 441 is in the first mode, the first transmission circuit 431 may have a high impedance state.

The image sensor not transmitting data may determine an operation mode of the image sensor transmitting data as a low-power operation mode based on a low-power signal sequence output by the image sensor transmitting data.

In FIGS. 7A and 7B, 410 may be a PCB, 421 may be a reception circuit, 432 and 442 may be circuit boards, 433 and 443 may be wiring, 434 may be a first connector, 444 may be a second connector, and 450 may be a transmission line.

Figure 8A:
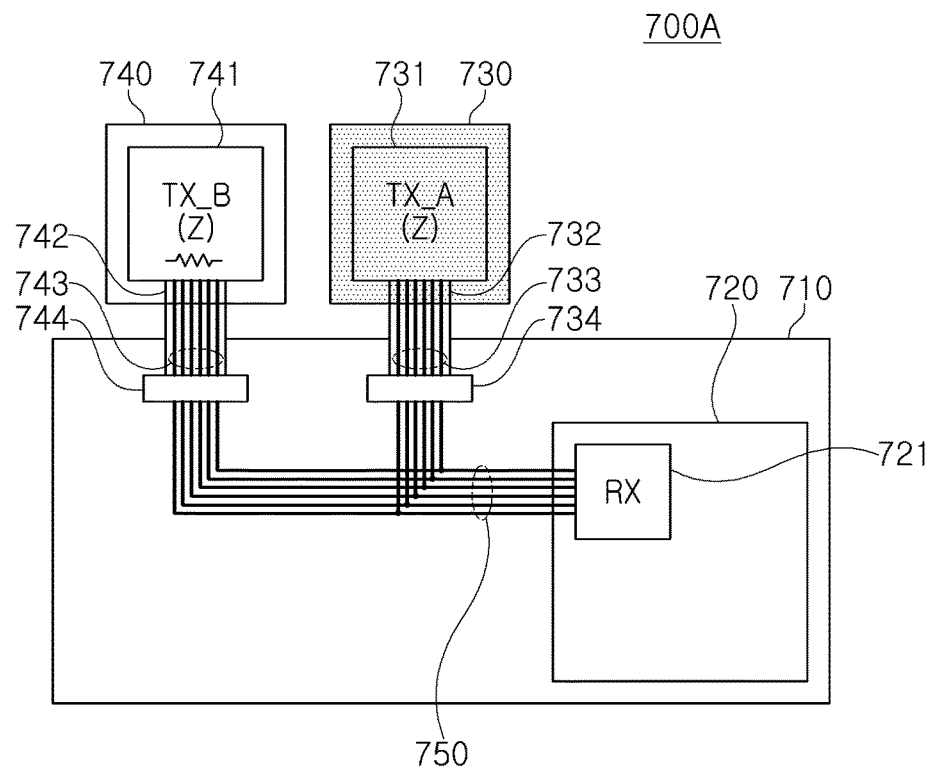
Figure 8B:
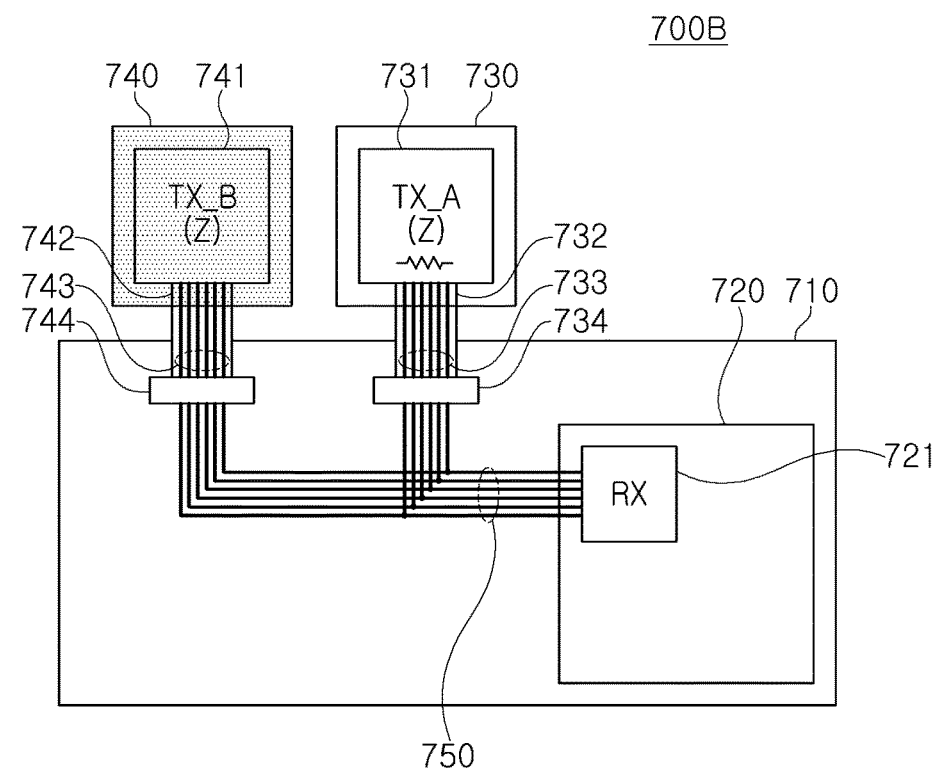

Referring to FIGS. 8A and 8B, electronic devices 700A and 700B in FIGS. 8A and 8B may have the same configuration as that of the electronic devices 400A and 400B in FIGS. 7A and 7B, and thus, the same description will not be repeated.

As illustrated in FIG. 8A, when the first image sensor 730 transmits data to the processor 720, the second image sensor 740 may not transmit data. When the first transmission circuit 731 of the first image sensor 730 is in a high-speed data transmission mode, a second termination resistor block of the second image sensor 740 may determine an output impedance of the second transmission circuit 741 of the second image sensor 740 to be designated as impedance Z. In other words, when the first transmission circuit 731 is in a second mode, the output impedance of the second transmission circuit 741 is designated as impedance Z.

Alternatively, as illustrated in FIG. 8B, when the second image sensor 740 transmits data to the processor 720, the first image sensor 730 may not transmit data. When the second transmission circuit 741 of the second image sensor 740 is in the high-speed data transmission mode, a first termination resistor block of the first image sensor 730 may determine an output impedance of the first transmission circuit 731 of the first image sensor 730 to be designated impedance Z. In other words, when the second transmission circuit 741 is in the second mode, the output impedance of the first transmission circuit 731 is designated as impedance Z.

The image sensor not transmitting data may determine an operation mode of the image sensor transmitting data as a high-speed data transmission mode based on a low-power signal sequence output by the image sensor transmitting data.

A value of the designated impedance may be determined within a range in which impedance matching for a signal transmitted through a transmission line may be properly carried out. For example, the value of the designated impedance may be determined in consideration of an output impedance of the transmission circuit that outputs data, and a distance between the transmission circuit which does not output data and the processor. In example embodiments of the present disclosure, the value of the designated impedance may appear to be the same as the output impedance Z of the transmission circuit that outputs the data, when viewed from the reception circuit.

FIGS. 9 to 12 are diagrams illustrating an operation of a termination resistor block according to an example embodiment of the present disclosure.

Figure 9:
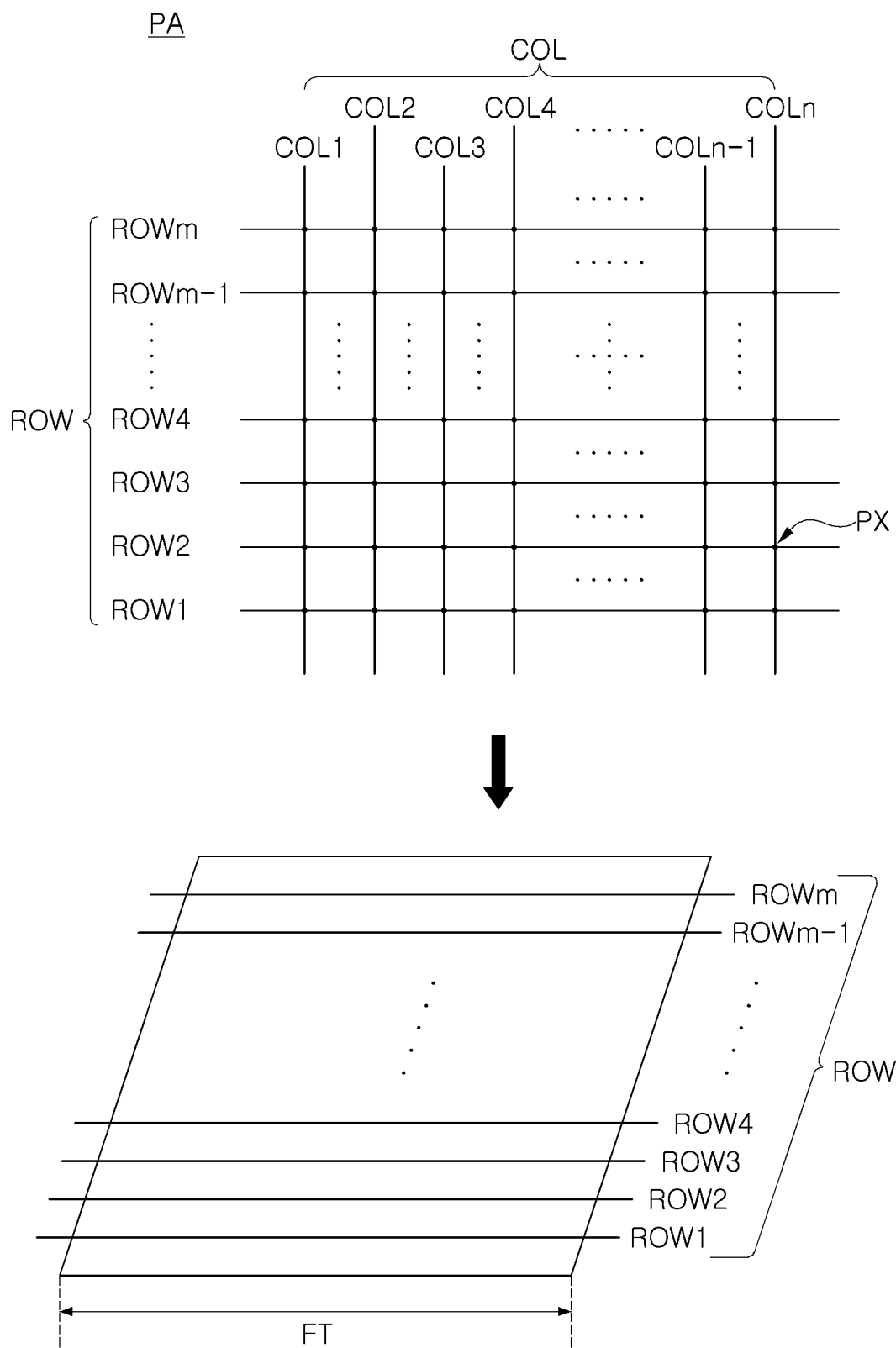
FIGS. 9, 10, 11 and 12 are diagrams illustrating an operation of a termination resistor block according to an example embodiment of the present disclosure.

Referring to FIG. 9, a pixel array PA of the image sensor may include a plurality of pixels PX. The plurality of pixels PX may be connected to a plurality of row lines ROW1-ROWm (ROW) and a plurality of column lines COL1-COLn (COL). The image sensor may drive the plurality of pixels PX by a unit of the plurality of row lines ROW. For example, the time period required to drive the select driving line among the plurality of row lines and to read a reset voltage and a pixel voltage from the pixels PX connected to the select driving line may be referred to as a single horizontal period. The image sensor may operate by a rolling shutter method for sequentially driving the plurality of row lines ROW.

A frame period FT of the image sensor may be referred to as time periods required to read a reset voltage and a pixel voltage from all pixels included in the pixel array PA. For example, the frame period FT may be equal to or greater than a product of the number of the plurality of row lines ROW and the horizontal period. The shorter the frame period FT of the image sensor, the image sensor may generate the greater number of image frames during the same period of time.

A single frame data may include M (e.g., an integer equal to or greater than two) number of pieces of line data. A horizontal blank period may be present between the first line data and the second line data, and a vertical blank period may be present between the first frame data and the second frame data.

Figure 10:
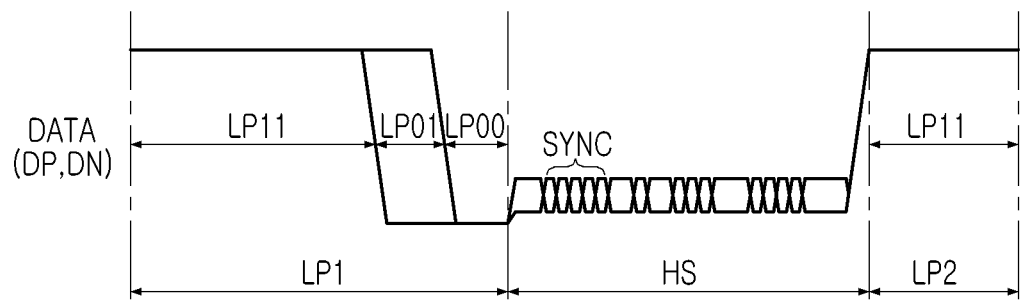

Referring to FIG. 10, when the image sensor transmits a signal, an operation mode of the transmission circuit may include a low-power operation mode and a high-speed data transmission mode. Low-power operation periods LP1 and LP2 (LP) may refer to a period, in which the transmission circuit operates in a low-power operation mode, and a high-speed data transmission period (HS) may refer to a period in which the transmission circuit operates in a high-speed data transmission mode. When the transmission circuit is in the low-power operation mode, the signal may be a single-ended signal, and when the transmission circuit is in a high-speed data transmission mode, the signal may be a differential signal.

The transmission circuit may output a low-power signal sequence (LP11) in the low-power operation periods LP1 and LP2, and may output a low-power signal sequence LP11, LP01, and LP00 when entering the high-speed data transmission period (HS). In other words, prior to entering the high-speed data transmission period (HS), the low-power signal sequence will switch from LP11 to LP01 then to LP00. The low-power signal sequence LP11, LP01, and LP00 may be a sequence indicating that the transmission circuit is switched from the low-power operation mode to the high-speed data transmission mode.

The line data DATA may include a positive data signal DP and a negative data signal DN. During the first low-power operation period LP1, the line data DATA may include low-power signal sequences LP11, LP01, and LP00. During the high-speed data transmission period HS, the line data DATA may include a sync code SYNC and serial normal data, in other words, payload data. The sync code SYNC may refer to a predetermined code for data synchronization before transmitting normal data. During the second low-power operation period LP2 in which the transmission circuit operates in the low-power operation mode, the line data DATA may include the low-power signal sequence LP11.

The termination resistor block in an example embodiment of the present disclosure may detect a low-power signal sequence and may determine an operation mode of a transmission circuit transmitting data based on a result of the detection. For example, when it is detected that the low-power signal sequence is "11, 01, and 00," the termination resistor block may detect that the operation mode of the transmission circuit for transmitting data is switched from the low-power operation mode to the high-speed data transmission mode. In addition, when it is detected that the low-power signal sequence is "11," the termination resistor block may detect that the operation mode of the transmission circuit transmitting data is in the low-power operation mode. Accordingly, the termination resistor block of the image sensor not transmitting data may be used to determine the operation mode of the image sensor transmitting the data based on the low-power signal sequence output by the image sensor transmitting data. In addition, the image sensor not transmitting the data may adjust an output impedance of the image sensor not transmitting the data based on the operation mode of the image sensor transmitting the data.

For example, when the operation mode of the image sensor transmitting data is the low-power operation mode, the transmission circuit of the image sensor not transmitting data may have a high impedance state. When the operation mode of the image sensor transmitting data is in the high-speed data transmission mode, the termination resistor block of the image sensor not transmitting data may determine an output impedance to be the designated impedance.

Figure 11:
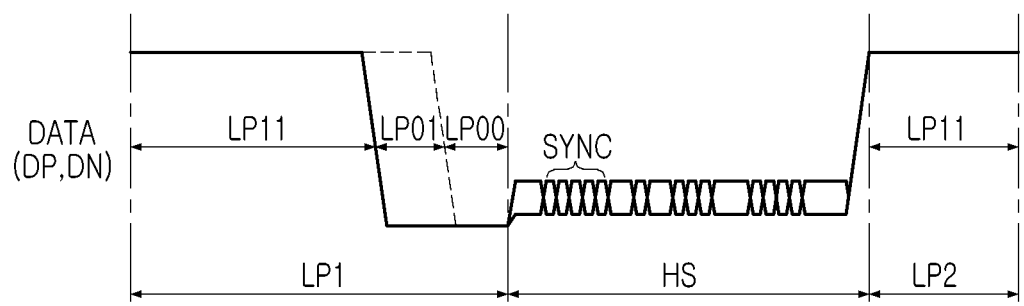

When resistors are connected to the output terminals of the transmission circuits of all image sensors to support impedance matching, signal distortion may occur when an operation mode of an image sensor transmitting data is in the low-power operation mode. Referring to FIG. 11, when the transmission circuit transmits a low-power signal LP01 in which a positive data signal DP and a negative data signal DN have different levels, included in the low-power signal sequence transmitted during the first low-power operation period LP1, a current may flow to the transmission circuit of the image sensor not transmitting data. Accordingly, an error may occur in the low-power signal LP01.

Figure 12:
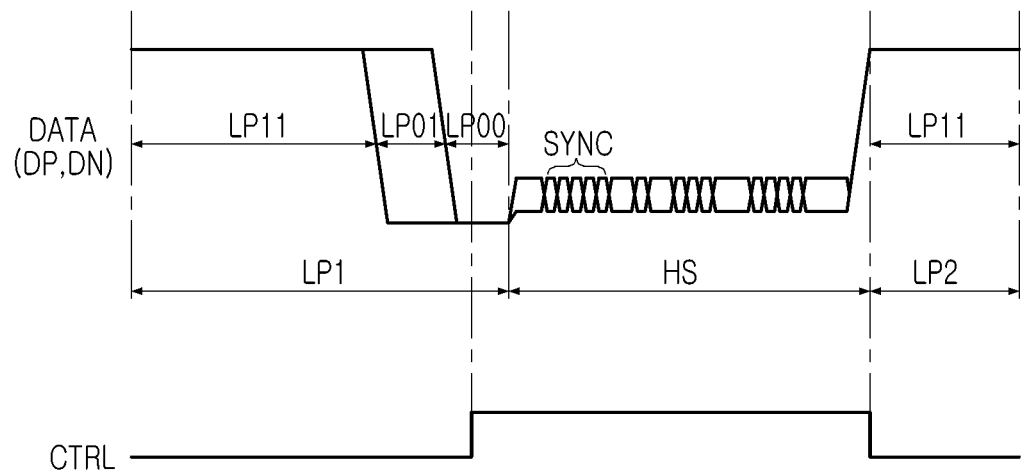

Therefore, as illustrated in FIG. 12, only during the high-speed data transmission period HS in which the transmission circuit of the image sensor transmitting data operates in the high-speed data transmission mode, the termination resistor block of the image sensor not transmitting data may generate a control signal CTRL for determining an output impedance to be the designated impedance. The output impedance of the transmission circuit of the image sensor not transmitting data may be determined to be the designated impedance based on the control signal CTRL.

Figure 13:
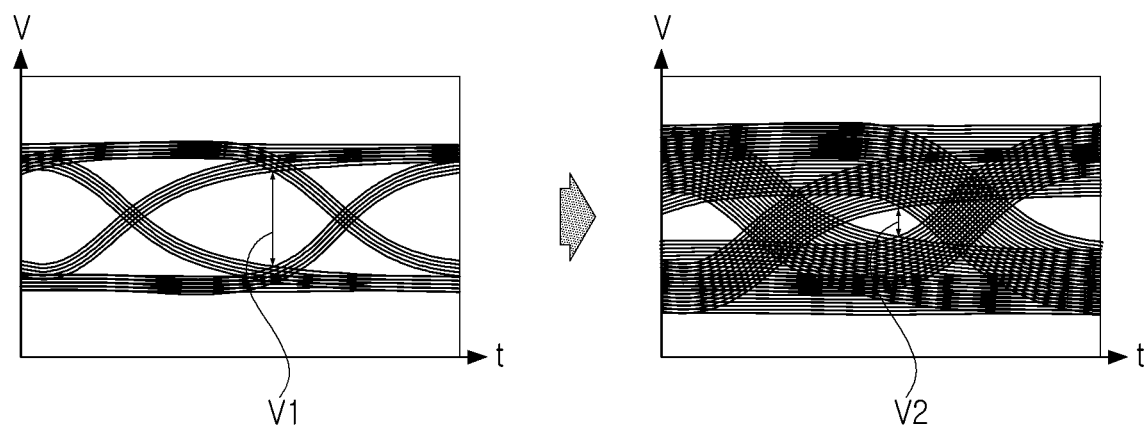
FIG. 13 is an eye-diagram illustrating an interface circuit according to an example embodiment of the present disclosure.

FIG. 13 is an eye-diagram illustrating an interface circuit according to an example embodiment of the present disclosure.

Referring to the eye-diagram in FIG. 13, an eye opening height V2 of a multi-drop method may be smaller than an eye opening height V1 of a point-to-point method. The eye opening height may be measured based on a minimum level and a maximum level of voltage levels. To increase the eye opening height V2 in the multi-drop method, data transmission speed may need to be reduced, and accordingly, high-speed data communication may not be properly performed.

The interface circuit in an example embodiment of the present disclosure a lay include a termination resistor block for adjusting an output impedance of the transmission circuit. Therefore, the eye opening height V2 in the multi-drop method may increase. In other words, the plurality of image sensors may share a transmission line, and high-speed data communication may be performed.

FIGS. 14, 15A, 15B and 15C are circuits illustrating an operation of an interface circuit according to an example embodiment of the present disclosure.

Figure 14:
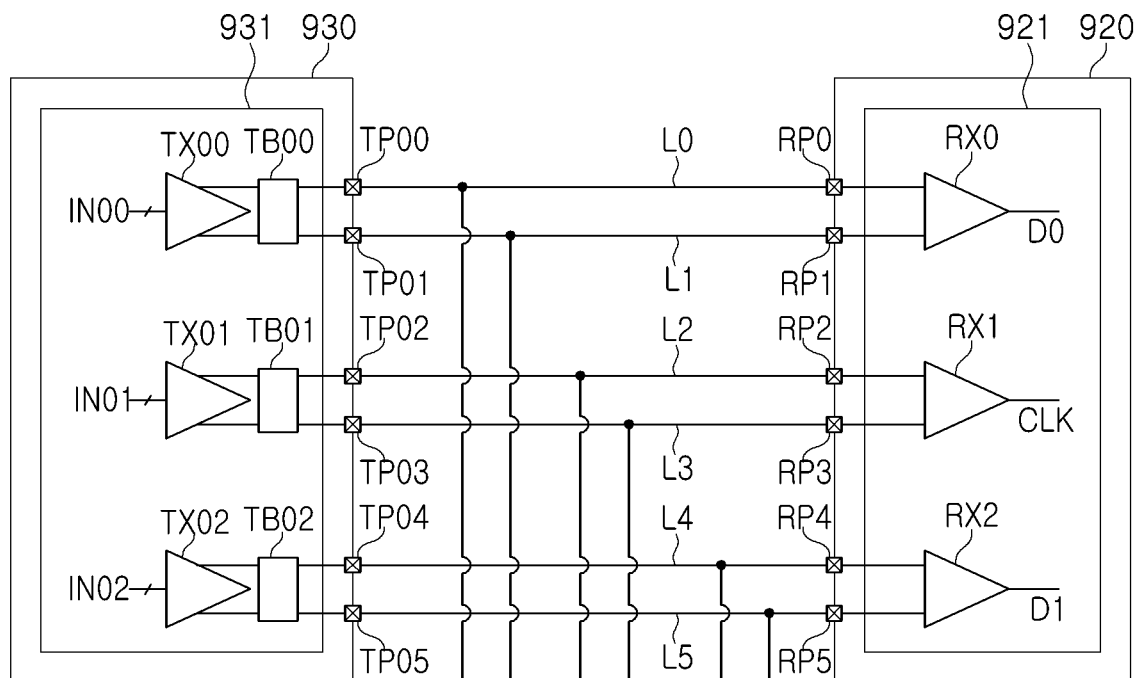
FIGS. 14, 15A, 15B and 15C are circuits illustrating an operation of an interface circuit according to an example embodiment of the present disclosure.
Figure 14:
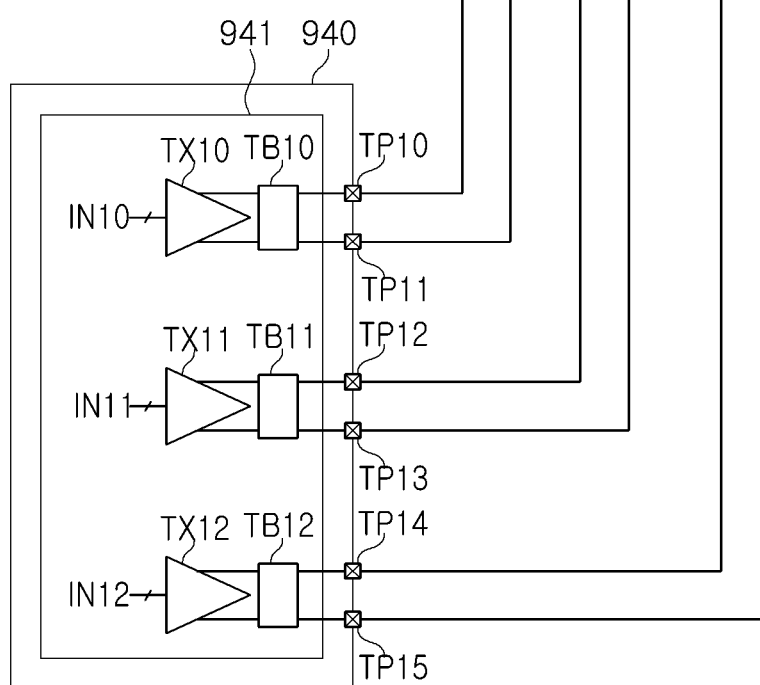

Referring to FIG. 14, an electronic device 900 may include a first image sensor 930, a second image sensor 940, a processor 920, and transmission lines L0, L1, L2, L3, L4 and L5. The first image sensor 930 may include a first transmission circuit 931 including a plurality of transmitters TX00, TX01 and TX02. The plurality of transmitters TX00-TX02 may transmit data to the transmission lines L0-L5 via transfer pads TP00, TP01, TP02, TP03, TP04 and TP05. The second image sensor 940 may include a second transmission circuit 941 including a plurality of transmitters TX10, TX11 and TX12, and the plurality of transmitters TX10-TX12 may transmit data to the transmission lines L0-L5 via transfer pads TP10, TP11, TP12, TP13, TP14 and TP15. The processor 920 may include a reception circuit 921 including a plurality of receivers RX0, RX1 and RX2, and the plurality of receivers RX0-RX2 may transmit the data via reception pads RP0, RP1, RP2, RP3, RP4 and RP5.

The plurality of transmitters TX00, TX01, TX02, TX10, TX11, and TX12 may include termination resistor blocks TB00, TB01, TB02, TB10, TB11, and TB12 between corresponding transmission lines, respectively. The termination resistor blocks TB10, TB11, and TB12 of the second image sensor 940, which does not transmit data, may detect a low-power signal sequence output by the first transmission circuit 931 transmitting data, and may adjust an output impedance of the second transmission circuit 941 in response to the low-power signal sequence. For example, the termination resistor blocks TB10, TB11, and TB12 may electrically connect or disconnect a unit resistor between the transfer pads TP10-TP15 in response to the low-power signal sequence.

The termination resistor blocks TB10, TB11, and TB12 may detect a low-power signal sequence output by the first transmission circuit 931 in the low-power operation mode, and may determine whether the first transmission circuit 931 enters the high-speed transmission mode based on a result of the detection. When it is determined that the first transmission circuit 931 has entered the high-speed data transmission mode, the termination resistor blocks TB10, TB11, and TB12 may electrically connect a unit resistor between the transfer pads TP10-TP15. Accordingly, an output impedance of the second transmission circuit 941 may be determined to be the designated impedance.

The termination resistor blocks TB10, TB11, and TB12 may detect a low-power signal sequence output by the first transmission circuit 931 in the low-power operation mode, and when it is determined that the first transmission circuit 931 is in the low-power operation mode as a result of the detection, the terminal resistor blocks TB10, TB11, and TB12 may disconnect the unit resistor between the transfer pads TP10-TP15. Accordingly, the output impedance of the second transmission circuit 941 may have a high impedance state.

Figure 15A:
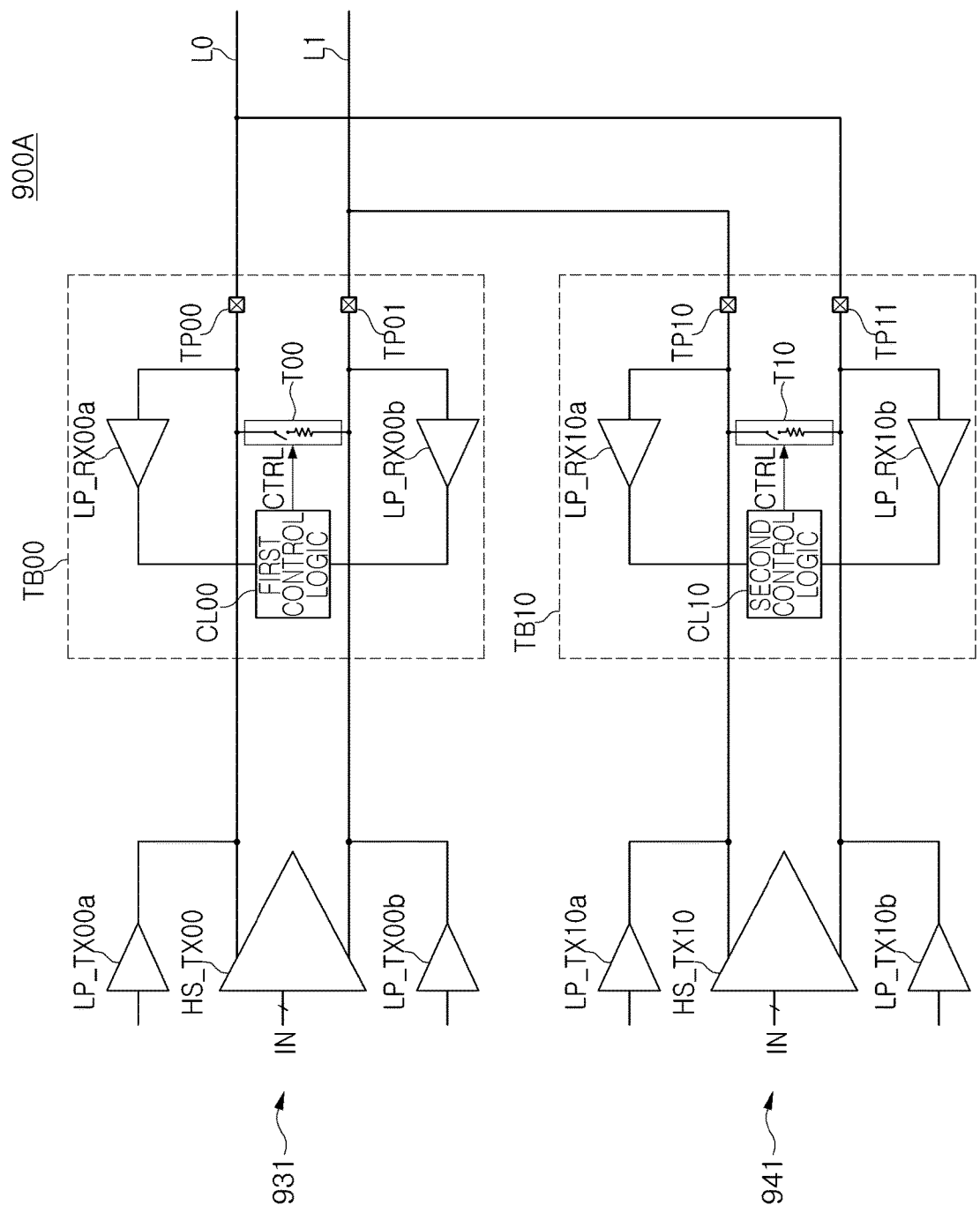
Figure 15B:
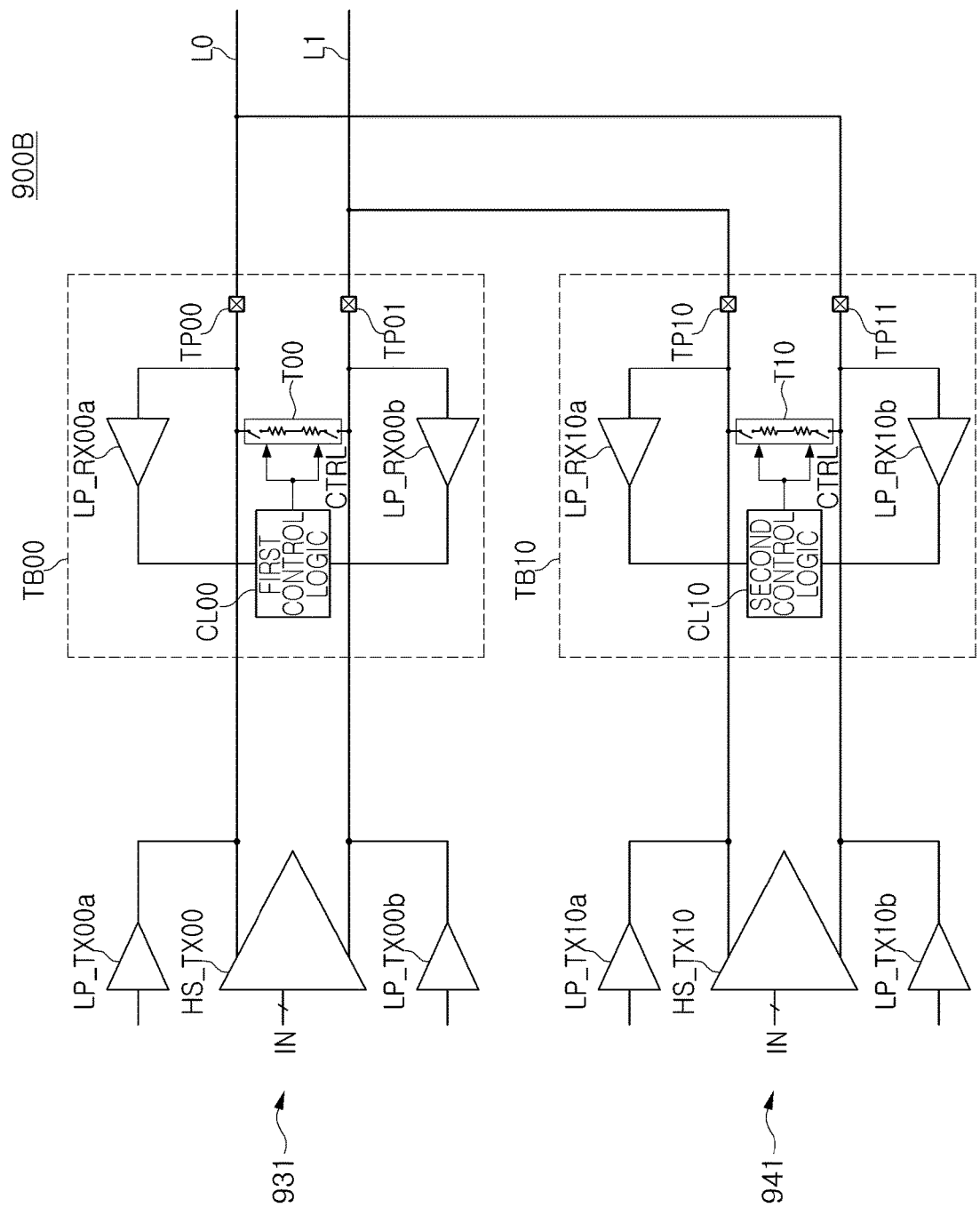
Figure 15C:
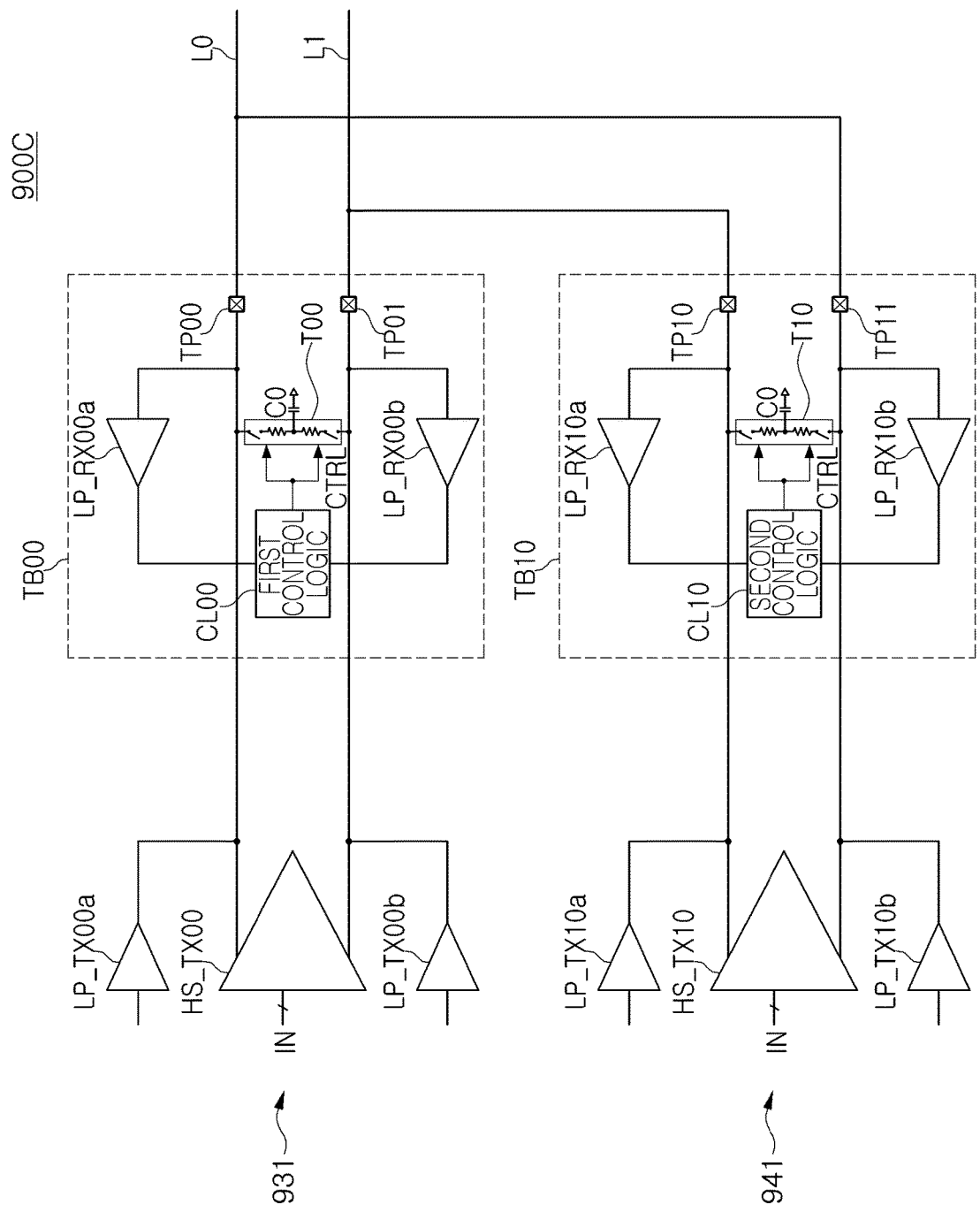

In FIGS. 15A to 15C, it is assumed that a single image sensor may include a single transmission circuit. In FIGS. 15A to 15C, 900A, 900B and 900C each refer to an electronic device.

Referring to FIG. 15A, a first transmission circuit 931 may include a high-speed transmitter HS_TX00 and a plurality of low-power transmitters LP_TX00a and LP_TX00b, and a second transmission circuit 941 may include a high-speed transmitter HS_TX10 and a plurality of low-power transmitters LP_TX10a and LP_TX10b. The first transmission circuit 931 and the second transmission circuit 941 may share transmission lines L0 and L1. The first transmission circuit 931 may further include a plurality of transfer pads TP00 and TP01 for outputting signals to the transmission lines L0 and L1, and a first termination resistor block TB00 connected between the transfer pads TP00 and TP01. The second transmission circuit 941 may further include a plurality of transfer pads TP10 and TP11 for outputting signals to the transmission lines L0 and L1, and a second termination resistor block TB10 connected between the transfer pads TP10 and TP11.

The first termination resistor block TB00 may include a first termination circuit T00, first low-power receivers LP_RX00a and LP_RX00b, and a first control logic CL00. The first termination circuit T00 may include a unit resistor and a unit switch device connected to the transfer pads TP00 and TP01 and connected to each other in series. For example, the unit resistor may be connected to the transfer pad TP01 and the unit switch device may be connected to the transfer pad TP00. An terminal of the first low-power receiver LP_RX00a may be connected to the first transfer pad TP00, and an output terminal of the first low-power receiver LP_RX00a may be connected to the first control logic CL00. An input terminal of the first low-power receiver LP_RX00b may be connected to the second transfer pad TP01, and an output terminal of the first low-power receiver LP_RX00b may be connected to the first control logic CL00. The first control logic CL00 may generate a control signal CTRL based on an input signal of the first low-power receivers LP_RX00a and LP_RX00b, and may control turn-on and turn-off states of the unit switch device of the first termination circuit T00 based on the control signal CTRL. The first control logic CL00 may be configured as a finite state machine (FSM), but the present disclosure is not limited thereto.

The second termination resistor block TB10 may include a second termination circuit T10, second low-power receivers LP_RX10a and LP_RX10b, and a second control logic CL10. The second termination circuit T10 may include a unit resistor and a unit switch device connected to the transfer pads TP1 and TP11 and connected to each other in series. For example, the unit resistor may be connected to the transfer pad TP11 and the unit switch device may be connected to the transfer pad TP10. An input terminal of the second low-power receiver LP_RX10a may be connected to the first transfer pad TP10, and an output terminal of the second low-power receiver LP_RX10a may be connected to the second control logic CL10. An input terminal of the first low-power receiver LP_RX10b may be connected to the second transfer pad TP11, and an output terminal of the second low-power receiver LP_RX10b may be connected to the second control logic CL10. The second control logic CL10 may generate a control signal CTRL based on input signals of the second low-power receivers LP_RX10a and LP_RX10b, and may control turn-on and turn-off states of the unit switch device of the second termination circuit T10 based on the control signal CTRL.

In an example embodiment of the present disclosure, the first transmission circuit 931 may transmit data, and the second transmission circuit 941 may not transmit data. The first low-power transmitters LP_TX00a and LP_TX00b may output a low-power signal sequence to the transmission fines L0 and L1 via the plurality of transfer pads TP00 and TP01 in the low-power operation mode. The second low-power receivers LP_RX10a and LP_RX10b may receive a low-power signal sequence output by the first low-power transmitters LP_TX00a and LP_TX00b. The second low-power receiver LP_RX10a may receive a positive data signal of the signal, and the second low-power receiver LP_RX10b may receive a negative data signal of the signal.

The second control logic CL10 may receive the positive data signal and the negative data signal from the second low-power receivers LP_RX10a and LP_RX10b. The second control logic CL10 may determine that the first transmission circuit 931 enters the high-speed data transmission mode when a low-power signal sequence of a specific pattern, "11", "01", and "00" pattern, for example, is detected. It is to be understood that the low-power signal sequence is not limited to the aforementioned pattern and various other patterns may be employed to identify the high-speed data transmission mode. The second control logic CL10 may turn on the unit switch device of the second termination circuit T10. When the unit switch device of the second termination circuit T10 is turned on, the unit resistor may be connected between the transfer pads TP10 and TP11.

The second control logic CL10 may determine that the first transmission circuit 931 is in a low-power operation mode when a low-power signal sequence of a specific pattern, "11" pattern, for example, is detected. It is to be understood that the low-power signal sequence is not limited to the aforementioned pattern and various other patterns may be employed to identify the low-power operation mode. The second control logic CL10 may turn off the unit switch device of the second termination circuit T10. When the unit switch device of the second termination circuit T10 is turned off, the unit resistor may be disconnected between the transfer pads TP10 and TP11.

In other words, when the first transmission circuit 931 is in the low-power operation mode, the unit resistor of the second termination circuit T10 may not be connected between the transfer pads TP10 and TP11, and an output it impedance of the second transmission circuit 941 may have a high impedance. When the first transmission circuit 931 is in the high-speed data transmission mode, the unit resistor of the second termination circuit T10 may be connected between the transfer pads TP10 and TP11, and the output impedance of the second transmission circuit 941 may be determined to be the designated impedance. The designated impedance may be a sum of a turn-on resistance of the unit switch device and a resistance value of the unit resistor of the second termination circuit 110. Accordingly, the first and second termination circuits T00 and T10 may perform impedance matching on signals transmitted to the transfer pads TP00, TP01, TP10, and TP11.

In another example embodiment of the present disclosure, the second transmission circuit 941 may transmit data, and the first transmission circuit 931 may not transmit data. The second low-power transmitters LP_TX10a and LP_TX10b may output a low-power signal sequence to the transmission lines L0 and L1 via the plurality of transfer pads TP10 and TP11. The first low-power receivers LP_RX00a and LP_RX00b may receive a low-power signal sequence output by the second low-power transmitters LP_TX10a and LP_TX10b, and may, output the sequence to the first control logic CL00.

The first control logic CL00 may determine that the second transmission circuit 941 enters the high-speed data transmission mode when a low-power signal sequence of a specific pattern, "11", "01", "01" pattern, for example, is detected. The first control logic CL00 may turn on the unit switch device of the first termination circuit T00. When the unit switch device of the first termination circuit T00 is turned on, the unit resistor may be connected to the transfer pads TP00 and TP01.

The first control logic CL00 may determine that the second transmission circuit 941 is in a low-power operation mode when a low-power signal sequence of a specific pattern, "11" pattern, for example, is detected. The first control logic CL00 may turn off the unit switch device of the first termination circuit T00. When the unit switch device of the first termination circuit T00 is turned off, the unit resistor may be disconnected from the transfer pads TP00 and TP01.

In other words, when the second transmission circuit 941 is in the low-power operation mode, the unit resistor of the first termination circuit T00 may not be connected to the transfer pads TP00 and TP01, and an output impedance of the first transmission circuit 931 may have a high impedance. When the second transmission circuit 941 is in the high-speed data transmission mode, the unit resistor of the first termination circuit T00 may be connected to the transfer pads TP00 and TP01, and the output impedance of the first transmission circuit 931 may be determined to be the designated impedance. Accordingly, the first and second termination circuits T00 and T10 may perform impedance matching on signals transmitted to the transfer pads TP00, TP01, TX10, and TX11.

In FIG. 15B, differently from FIG. 15A, each of the first termination circuit T00 and the second termination circuit T10 may include unit switch devices connected between the transfer pads TP00 and TP01 and connected to each other in series, and unit resistors connected in series between the unit switch devices. Each of the first termination circuit T00 and the second termination circuit T10 in FIG. 15E may have symmetry in impedance load, thereby further reducing a difference in impedance.

In FIG. 15C, differently from FIG. 15B, each of the first termination circuit T00 and the second termination circuit T10 may include unit switch devices connected between the transfer pads TP00 and TP01 and connected to each other in series, and unit resistors connected in series between the unit switch devices, and may further include a common mode capacitor between the unit resistors. Each of the first termination circuit T00 and the second termination circuit T10 in FIG. 15C may stably transmit data in the high-speed data transmission mode.

In FIGS. 15A to 15C, a single image sensor may include a single transmission circuit, but the number of transmission circuits included in a single image sensor may be varied.

Figure 16:
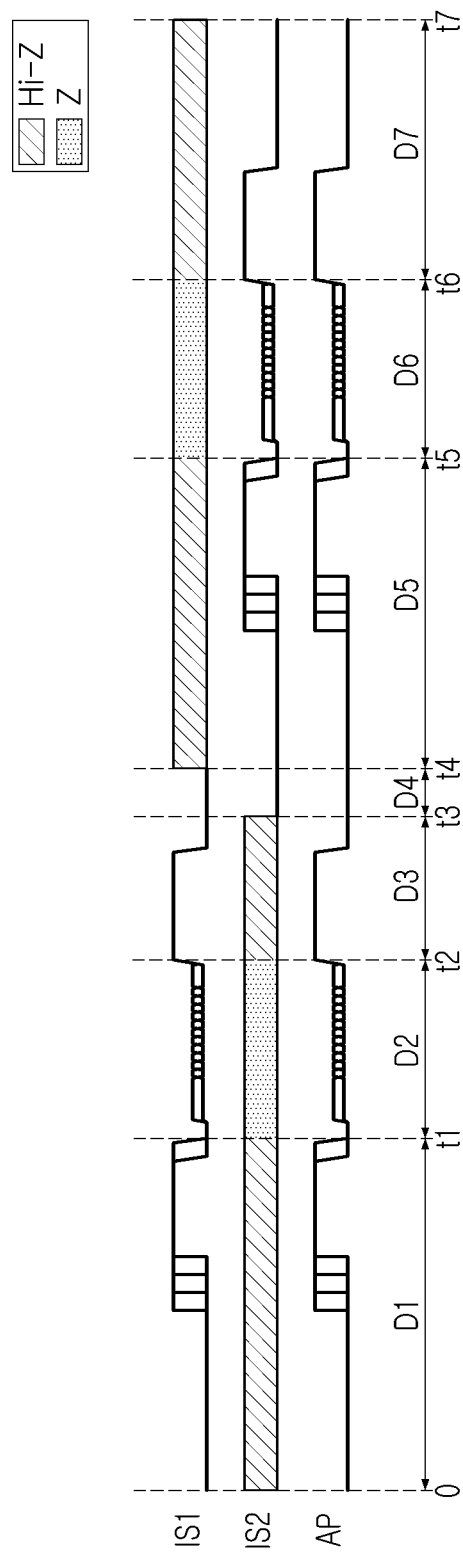
FIGS. 16 and 17 are timing diagrams of an interface operation according to an example embodiment of the present disclosure.
Figure 17:
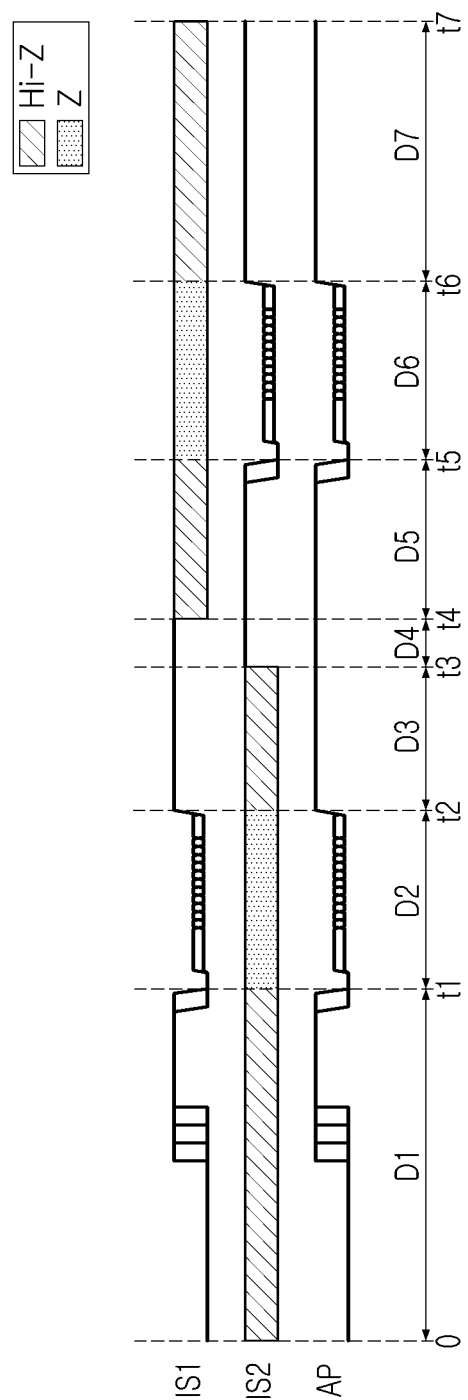

FIGS. 16 and 17 are timing diagrams of an interface operation according to an example embodiment of the present disclosure.

Referring to FIG. 16, during a first time period D1, a first image sensor IS1 may be enabled to transmit data, and a transmission circuit of the first image sensor IS1 may output a low-power signal sequence m a low power operation mode. During the first time period D1, an output impedance of the transmission circuit of the second image sensor IS2 may have a high impedance. During the first time period D1, a terminal resistance block of the second image sensor IS2 may detect the low-power signal sequence output by the first image sensor IS1, and may connect a unit resistor to the transfer pads at the first time t1. Accordingly, during a second time period D2, the output impedance of the transmission circuit of the second image sensor IS2 may be determined to be the designated impedance.

During the second time period D2, the transmission circuit of the first image sensor IS1 may output data in a high-speed data transmission mode. During the second time period D2, a termination resistor block of the second image sensor IS2 may perform impedance matching on data output by the first image sensor IS1.

At the second time t2, the terminal resistance block of the second image sensor IS2 may detect the low-power signal sequence output by the first image sensor IS1, and may disconnect the unit resistor between the transfer pads. Accordingly, during the third time period D3, the output impedance of the transmission circuit of the second image sensor IS2 may have the high impedance. During the third time period D3, the transmission circuit of the first image sensor IS1 may be disabled after operating in the low-power operation mode. During the fourth time period D4, the second image sensor IS2 may be disabled.

During the fourth time period D4, since both the first image sensor IS1 and the second image sensor IS2 may be disabled, power consumption may be reduced.

During the fifth time period D5, the second image sensor IS2 may be enabled to transmit data, and the transmission circuit of the second image sensor IS2 may output a low-power signal sequence in the low-power operation mode. When the second image sensor IS2 is enabled in the disabled state, an initialization time may be required. During the fifth time period D5, an output impedance of the transmission circuit of the first image sensor IS1 may have the high impedance.

At the fifth time t5, the terminal resistance block of the first image sensor IS1 may detect a low-power signal sequence output by the second image sensor IS2, and may connect a unit resistor between the transfer pads. Accordingly, during the sixth time period D6, the output impedance of the transmission circuit of the second image sensor IS2 may be determined to be the designated impedance.

During the sixth time period D6, the transmission circuit of the second image sensor IS2 may output data in a high-speed data transmission mode. During the sixth time period D6, the termination resistor block of the first image sensor IS1 may perform impedance matching on data output by the second image sensor IS2.

During the sixth time period D6, the terminal resistance block of the first image sensor IS1 may detect the low-power signal sequence output by the second image sensor IS2, and may disconnect the unit resistor from the transfer pads at the sixth time t6. Accordingly, during the seventh time period D7, the output impedance of the transmission circuit of the first image sensor IS1 may have the high impedance.

During the seventh time period D7, the transmission circuit of the second image sensor IS2 may be disabled after operating in the low-power operation mode.

The processor AP may appear to operate only a single image sensor during the first to seventh time periods D1-D7.

Referring to FIG. 17, differently from FIG. 16, during the fourth time period D4, the first image sensor IS1 and the second image sensor IS2 may not be disabled, and the transmission circuit of the first image sensor IS1 may maintain the low-power signal sequence at "11" in the low-power operation mode.

During the fifth time period D5, the transmission circuit of the second image sensor IS2 may output a low-power signal sequence in a low-power operation mode. Since the second image sensor IS2 is in an enabled state, an initialization time may not be required. During the seventh time period D7, the transmission circuit of the second image sensor IS2 may maintain an enabled state after operating in the low-power operation mode.

Referring, to FIG. 16, while the first image sensor IS1 and the second image sensor IS2 are in a disabled state during a vertical blank period, whereas referring to FIG. 17, the first image sensor IS1 and the second image sensor IS2 may maintain the enabled state during the vertical blank period, the vertical blank time may be reduced as compared to the example embodiment in FIG. 16. Accordingly, the frame rate may increase.

In the example embodiments of the present disclosure, the number of camera modules sharing the transmission line may be two, but the number of camera modules sharing a transmission line may be varied in other example embodiments of the present disclosure.

Figure 18:
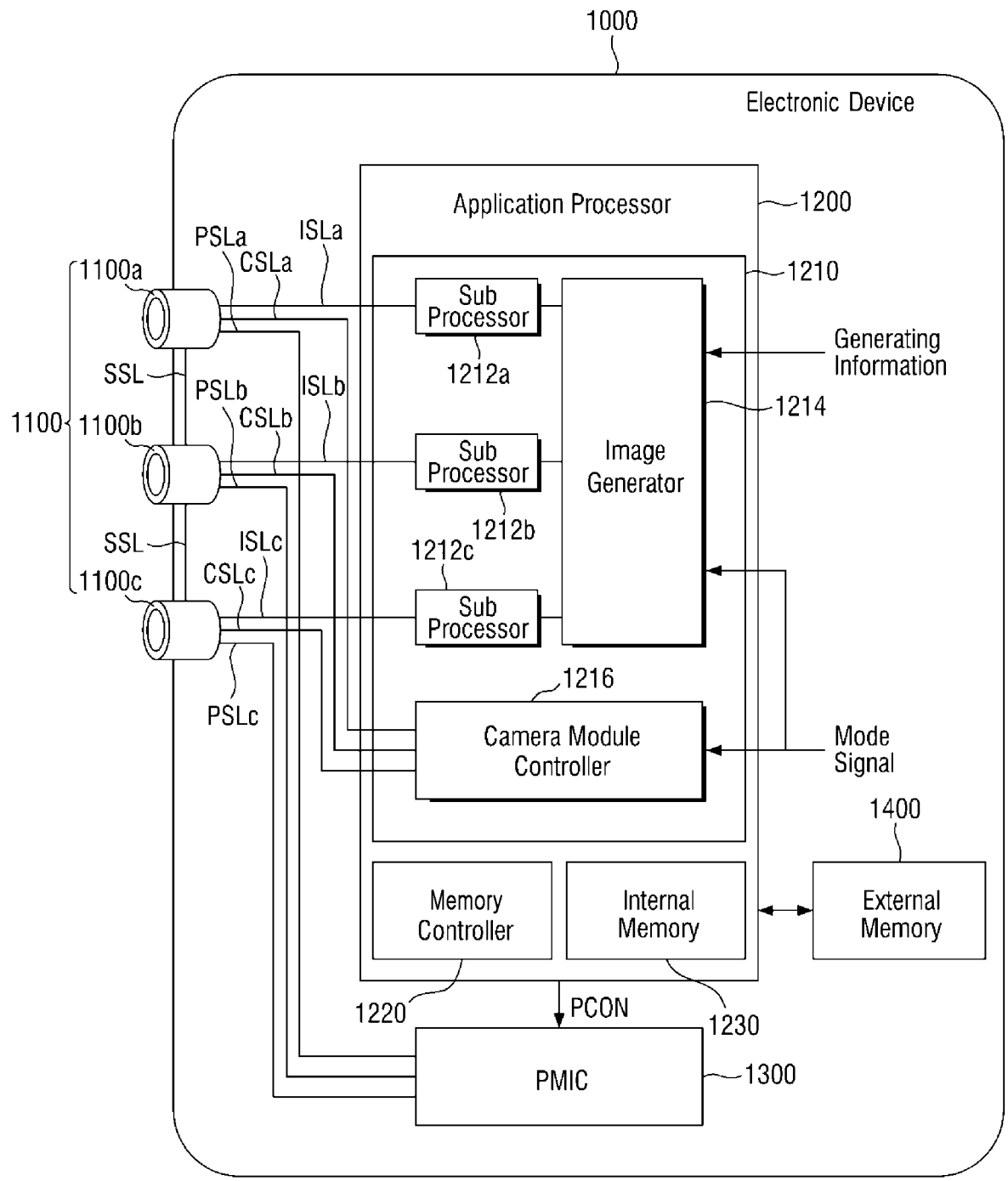
FIGS. 18 and 19 are diagrams illustrating an electronic device including an image sensor according to an example embodiment of the present disclosure.
Figure 19:
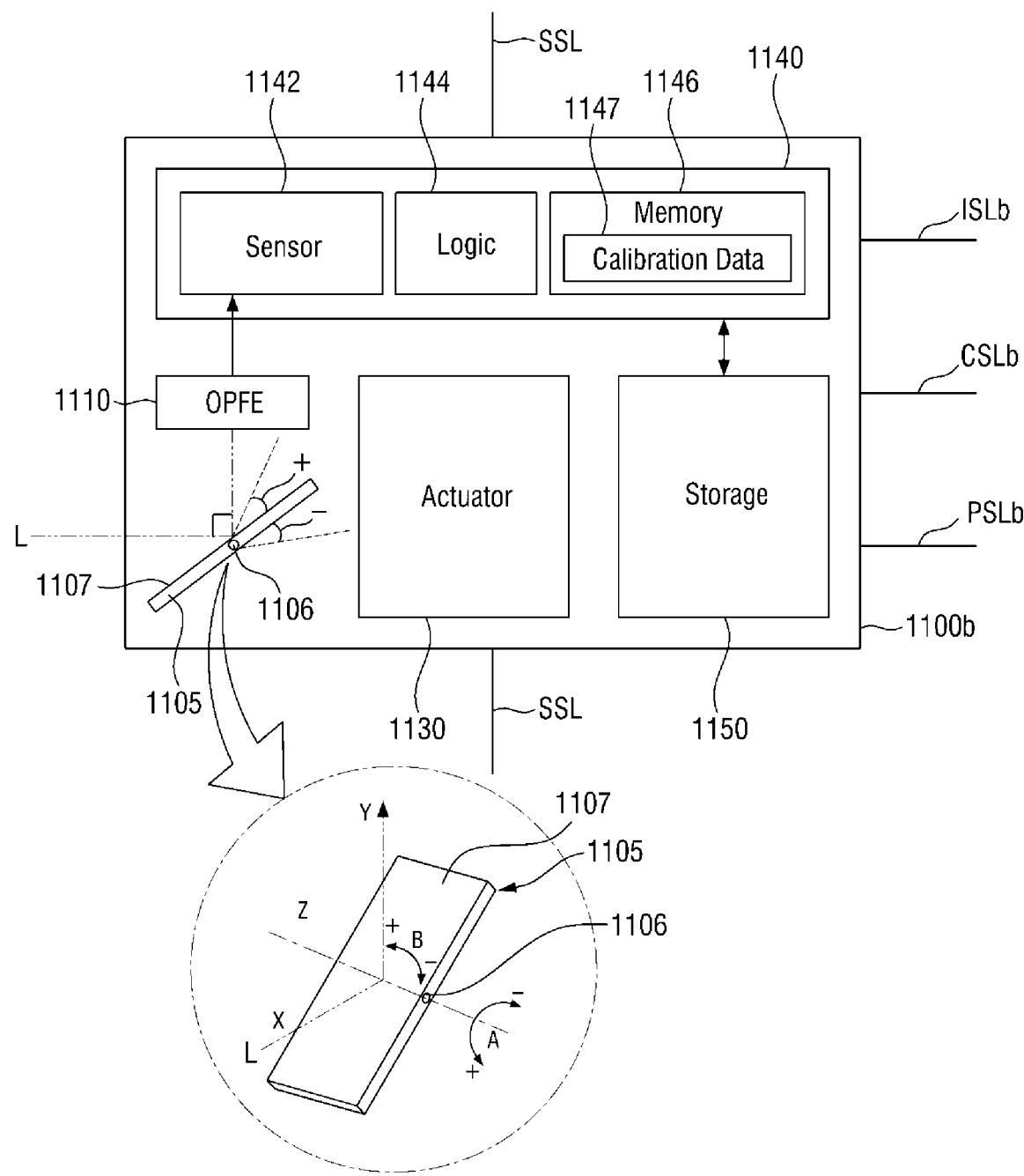

FIGS. 18 and 19 are diagrams illustrating an electronic device including an image sensor according to an example embodiment of the present disclosure.

Referring to FIG. 18, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. Although the drawing illustrates an example embodiment in which three camera modules 1100a, 1100b, and 1100c are arranged, the present disclosure is not limited thereto. For example, the camera module group 1100 may be modified to include only two camera modules. In addition, the camera nodule group 1100 may be modified to include n (n is a natural number equal to or greater than four) number of camera modules. Further, at least one of the plurality of camera modules 1100a, 1100b, and 1100c included in the camera module group 1100 may include an image sensor described in the example embodiments with reference to FIGS. 1 to 17.

In the description below, a detailed configuration of the camera module 1100b will be described in greater detail with reference to FIG. 19, and the description may also be applied to other camera modules 1100a and 1100b.

Referring to FIG. 19, the camera module 1100b may include a prism 1105, an optical path folding element (hereinafter, referred to as "OPFE") 1110, an actuator 1130, an image sensing device 1140, and a storage unit 1150.

The prism 1105 may include a reflective surface 1107 of a light reflecting material and may change a path of light L incident from the outside.

In example embodiments of the present disclosure, the prism 1105 may change a path of the light L incident in first direction X to be in a second direction Y perpendicular to the first direction X. In addition, the prism 1105 may rotate the reflective surface 1107 of the light reflecting material in a direction A around a central axis 1106, or may rotate the central axis 1106 in a direction B and may move the path of the incident light L incident in the first direction X to move in the vertical second direction Y. In this case, the OPFE 1110 may also move in a third direction Z perpendicular to the first direction X and the second direction Y.

In example embodiments of the present disclosure, as illustrated, a maximum rotation angle of the prism 1105 in the A direction may be 15 degrees or less in the positive (+) A direction, and may be greater than 15 degrees in the negative (−) A direction, but the present disclosure is not limited thereto.

In example embodiments of the present disclosure, the prism 1105 may move by about 20 degrees, between 10 degrees and 20 degrees, or between 15 degrees and 20 degrees in the positive (+) or negative (−) B direction. In addition, as for the moving angle, the prism 1105 may move by the same angle or by an almost similar angle of about 1 degree in the positive (+) or negative (−) B direction.

In example embodiments of the present disclosure, the prism 1105 may move the reflective surface 1106 of the light reflecting material in the third direction e.g., the Z direction) parallel to the extending direction of the central axis 1106.

The OPFE 1110 may include, for example, an optical lens consisting of m (where m is a natural number) number of groups. The m number of lenses may move in the second direction Y and may change an optical zoom ratio of the camera module 1100b. For example, when a basic optical zoom magnification of the camera module 1100b Z, and m number of optical lenses included in the OPFE 1110 are moved, the optical zoom magnification of the camera module 1100b may be changed to an optical zoom magnification of 3Z or 5Z or 5Z or higher.

The actuator 1130 may move the OPFE 1110 or the optical lens (hereinafter, referred to as "optical lens") to a specific position. For example, the actuator 1130 may adjust the position of the optical lens such that an image sensor 1142 may be positioned at a focal length of the optical lens for accurate sensing.

The image sensing, device 1140 may include the image sensor 1142, a control logic 1144, and a memory 1146. The image sensor 1142 may sense an image of a sensed target using light L provided through the optical lens. The control logic 1144 may control overall operations of the camera module 1100b. For example, the control logic 1144 may control operation of the camera module 1100b according to a control signal provided via a control signal line CSLb.

The memory 1146 may store information necessary for operation of the camera module 1100b, such as calibration data 1147. The calibration data 1147 may include information necessary for the camera module 1100b to generate image data using light L provided from the outside. The calibration data 1147 may include, for example, information about a degree of rotation described above, information about a focal length, information about an optical axis, and the like. When the camera module 1100b is implemented in the form of a multi-state camera of which a focal length changes according to the position of the optical lens, the calibration data 1147 may include local length values for each position (or each state) of the optical lens and information related to autofocusing.

The storage unit 1150 may store image data sensed via the image sensor 1142. The storage unit 1150 may be disposed externally of the image sensing device 1140 and may be implemented in a stacked form with a sensor chip forming the image sensing device 1140. In example embodiments of the present disclosure, the storage unit 1150 may be implemented as an electrically erasable programmable read-only memory (EEPROM), but the present disclosure is not limited thereto.

Referring to FIGS. 18 and 19 together, in example embodiments of the present disclosure, each of the plurality of camera modules 1100a, 1100b, and 1100c may include the actuator 1130. Accordingly, each of the plurality of camera modules 1100a, 1100b, and 1100c may include the same or different calibration data 1147 according to operation of the actuator 1130 included therein.

In example embodiments of the present disclosure, one camera module (e.g., 1100b) among a plurality of camera modules 1100a, 1100b, and 1100c may be configured as a folded lens-type camera module including the prism 1105 and the OPFE 1110 described above, and the other camera modules 1100a and 1100b) may be a vertical type camera module which does not include the prism 1105 and the OPFE 1110, but the present disclosure is not limited thereto.

In example embodiments of the present disclosure, one camera module (e.g., 1100c) among the plurality of camera modules 1100a, 1100b, and 1100c may be configured as a vertical-type depth camera which may extract depth information using infrared rays (IR), for example. In this case, the application processor 1200 may merge image data provided by the depth camera with image data provided by the other camera modules (e.g., 1100a or 1100b) and may generate a 3D depth image.

In example embodiments of the present disclosure, at least two camera modules (e.g., 1100a and 1100b) among the plurality of camera modules 1100a, 1100b, and 1100c may have different fields of view. In this case, for example, the optical lenses of at least two camera modules (e.g., 1100a and 1100b) among the plurality of camera modules 1100a, 1100b, and 1100c may be different, but the present disclosure is not limited thereto.

Further, in example embodiments of the present disclosure, fields of view of the plurality of camera modules 1100a, 1100b, and 1100c may be different. In this case, the optical lenses included in the plurality of camera modules 1100a, 1100b, and 1100c may also be different, but the present disclosure is not limited thereto.

In example embodiments of the present disclosure, the plurality of camera modules 1100a, 1100b, and 1100c may be physically separated from each other. In other words, an independent image sensor 1142 may be disposed in each of the plurality of camera modules 1100a, 1100b, and 1100c, rather than using a single image sensor 1142 and dividing its sensing area for use by the plurality of camera modules 1100a, 1100b, and 1100c.

Referring back to FIG. 18, the application processor 1200 may include an image processing device 1210, a memory controller 1220, and an internal memory 1230. The application processor 1200 may be implemented separately from the plurality of camera modules 1100a, 1100b, and 1100c. For example, the application processor 1200 and the plurality of camera modules 1100a, 1100b, and 1100c may be separated from each other as separate semiconductor chips.

The image processing device 1210 may include a plurality of sub-image processors 1212a, 1212b, and 1212c, an image generator 1214, and a camera module controller 1216.

The image processing device 1210 may include a plurality of sub-image processors 1212a, 1212b, and 1212c corresponding to the number of the plurality of camera modules 1100a, 1100b, and 1100c.

Image data generated by each of the camera modules 1100a, 1100b, and 1100c may be provided to the corresponding sub-image processors 1212a, 1212b, and 1212c via image signal lines ISLa, ISLb, and ISLc separated from each other. For example, image data generated by the camera module 1100a may be provided to the sub-image processor 1212a via the image signal line ISLa, image data generated by the camera module 1100b may be provided to the sub-image processor 1212b via the image signal line ISLb, and image data generated by the camera module 1100c may be provided to the sub-image processor 1212c via the image signal line ISLc. Such image data transmission may be performed using, for example, a camera serial interface (CSI) based on a mobile industry processor interface (MIPI), but the present disclosure is not limited thereto.

In example embodiments of the present disclosure, a single sub-image processor may be arranged to correspond to the plurality of camera modules. For example, the sub-image processor 1212a and the sub-image processor 1212c may be integrated as a single sub-image processor, rather than being separated from each other as illustrated, and image data provided by the camera modules 1100a and 1100c may be selected by a selection device (e.g., a multiplexer) and may be provided to the integrated sub-image processor.

The image data provided to each of the sub-image processors 1212a, 1212b, and 1212c may be provided to the image generator 1214. The image generator 1214 may generate an output image using the image data provided by each of the sub-image processors 1212a, 1212b, and 1212c according to a image generating information or a mode signal.

For example, the image generator 1214 may merge at least a portion of the image data generated by the camera modules 1100a, 1100b, and 1100c having different fields of view according to the image generation information or the mode signal. In addition, the image generator 1214 may generate an output image by selecting one of image data generated by camera modules 1100a, 1100b, and 1100c having different fields of view according to the image generation information or the mode signal.

In example embodiments of the present disclosure, the image generation information may include a zoom signal or a zoom factor. Further, in example embodiments of the present disclosure, the mode signal may be a signal based on a mode selected by a user.

When the image generation information is a zoom signal (or a zoom factor), and the camera modules 1100a, 1100b, and 1100c have different fields of view, the image generator 1214 may perform different operations depending on a type of the zoom signals. For example, when the zoom signal is a first signal, the image data output by the camera module 1100a may be merged with the image data output by the camera module 1100c, and an output image may be generated using the merged image signal and image data output by the camera module 1100b which was not used in the merge. When the zoom signal is a second signal different from the first signal, the image generator 1214 may not perform such image data merging, and may select one of the image data output by each camera module 1100a, 1100b, and 1100c and may generate an output image. However, the present disclosure is not limited thereto, and a method of processing the image data may be varied if desired.

In example embodiments of the present disclosure, the image generator 1214 may receive a plurality of pieces of image data having different exposure times from at least one of the plurality of sub-image processors 1212a, 1212b, and 1212c, and may perform a high dynamic range (HDR) processing on the plurality of pieces of image data, thereby generating merged image data with an increased dynamic range.

The camera module controller 1216 may provide a control signal to each of the camera modules 1100a, 1100b and 1100c. The control signal generated by the camera module controller 1216 may be provided to corresponding camera modules 1100a, 1100b, and 1100c via control signal lines CSLa, CSLb, and CSLc separated from each other.

One of the plurality of camera modules 1100a, 1100b, and 1100c may be designated as a master camera (e.g., 1100b) according to image generation information including a zoom signal or a mode signal, and the other camera modules (e.g., 1100a and 1100c) may be designated as slave cameras. Such information may be included in the control signal and may be provided to corresponding camera modules 1100a, 1100b, and 1100c via the control signal lines CSLa, CSLb, and CSLc separated from each other.

Camera modules operating as masters and slaves may change depending on a zoom factor or an operation mode signal. For example, when a field of view of the camera module 1100a is wider than that of the camera module 1100b and a zoom factor exhibits a low zoom magnification, the camera module 1100b may operate as a master, and the camera module 1100a may operate a slave. Alternatively, when the zoom factor exhibits a high zoom magnification, the camera module 1100a may operate as a master and the camera module 1100b may operate as a slave.

In example embodiments of the present disclosure, a control signal provided by the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit a sync enable signal to the camera module 1100b. The camera module 1100b receiving the sync enable signal may generate a sync signal based on the received sync enable signal, and may provide the generated sync signal to the camera modules 1100a and 1100c via a sync signal line SSL. The camera module 1100b and the camera modules 1100a and 1100c may be synchronized with the sync signal and may transmit image data to the application processor 1200.

In example embodiments of the present disclosure, the control signal provided by the camera module controller 1216 to the plurality of camera modules 1100a, 1100b, and 1100c may include mode information based on the mode signal. Based on this mode information, the plurality of camera modules 1100a, 1100b and 1100c may operate in a first operation mode and a second operation mode in relation to a sensing speed.

In the first operation mode, the plurality of camera modules 1100a, 1100b, and 1100c may generate an image signal at a first rate (e.g., generating an image signal at a first frame rate), may encode the signal at a second rate higher than the first rate (e.g., encoding an image signal of a second frame rate higher than a first frame rate), and may transmit the encoded image signal to the application processor 1200. In this case, the second speed may be 30 times or less the first speed.

The application processor 1200 may store the received image signal, in other words, the encoded image signal, in the memory 1230 provided therein or a storage 1400 disposed externally of the application processor 1200, and thereafter, the application processor 1200 may read out the encoded image signal from the memory 1230 or the storage 1400 and may decode the signal, and may display image data generated based on the decoded image signal. For example, a corresponding sub-processor among the plurality of sub-processors 1212a, 1212b, and 1212c of the image processing device 1210 may perform the decoding, and, may also perform image processing on the decoded image signal.

In the second operation mode, the plurality of camera modules 1100a, 1100b, and 1100c may generate an image signal at a third rate lower than the first rate (e.g., generating an image signal of a third frame rate lower than the first frame rate), and may transmit the image signal to the application processor 1200. The image signal provided to the application processor 1200 may be an unencoded signal. The application processor 1200 may perform image processing on the received image signal or may store the image signal in the memory 1230 or the storage 1400.

The PMIC 1300 may supply power, a power voltage, for example, to each of the plurality of camera modules 1100a, 1100b, and 1100c. For example, the PMIC 1300 may supply first power to the camera module 1100a via a power signal line PSLa, may supply second power to the camera module 1100b via a power signal line PSLb, and may supply third power to the camera module 1100c via the power signal line PSLc.

The PMIC 1300 may generate power corresponding to each of the plurality of camera modules 1100a, 1100b, and 1100c, in response to the power control signal PCON from the application processor 1200, and may also adjust a level of power. The power control signal PCON may include a power adjustment signal for each operation mode of the plurality of can modules 1100a, 1100b, and 1100c. For example, the operation mode may include a low-power mode, and in this case, the power control signal PCON may include information on a camera module operating in a low-power mode and a determined power level. The levels of powers provided to the plurality of camera modules 1100a, 1100b, and 1100c may be the same or different. In addition, the level of power may dynamically change.

According to the aforementioned example embodiments of the present disclosure, as the interface circuit adjusts an output impedance of the transmission circuit, the plurality of image sensors may share a transmission line and high-speed data communication may be performed.

While the example embodiments of the present disclosure have been illustrated and described above, it will be apparent to those skilled in the an that modifications and variations could be made thereto without departing from the scope of the present disclosure as set forth by the appended claim.

What is claimed is:

1. An interface circuit, comprising:
a first transmission circuit configured to output a first signal to a transmission line via first transfer pads; and
a second transmission circuit configured to output a second signal to the transmission line via second transfer pads,
wherein the first transmission circuit includes a first termination resistor block including a first switch and a first termination resistor connected in series between the first transfer pads,
wherein the second transmission circuit includes a second termination resistor block including a second switch and a second termination resistor connected in series between the second transfer pads,
wherein, during a first time period, the first transmission circuit is enabled to transmit data and outputs the first signal in a first mode, and during the first time period, the second transmission circuit has a high output impedance, and the second termination resistor block detects the first signal output from the first transmission circuit, and in response to the detection of the first signal, the second terminal resistor block connects the second termination resistor between the second transfer pads such that during a second time period after the first time period, the output impedance of the second transmission circuit has a designated impedance,
wherein, during the second time period, the first transmission circuit outputs data in a second mode, and the second termination resistor block performs impedance matching on the data output from the first transmission circuit, and
wherein the first mode is a mode in which less power is consumed compared to the second mode, and the second mode is a mode in which data is transmitted at a faster speed compared to the first mode.

2. The interface circuit of claim 1, wherein the second termination resistor block adjusts the output impedance of the second transmission circuit by connecting or disconnecting the second termination resistor between the second transfer pads.

3. The interface circuit of claim 2, wherein, when the first transmission circuit is in the second mode, the second termination resistor block determines the output impedance of the second transmission circuit to be the designated impedance corresponding to a sum of a turn-on resistance of the second switch and a resistance of the second termination resistor.

4. The interface circuit of claim 1, wherein the second termination resistor block detects a signal sequence included in the first signal, and determines whether the first transmission circuit enters the second mode based on a result of the detection.

5. The interface circuit of claim 1, wherein the second termination resistor block includes:
a first receiver including an input terminal connected to one of the second transfer pads;
a second receiver including an input terminal connected to the other one of the second transfer pads; and
a control logic connected to an output terminal of the first receiver and an output terminal of the second receiver.

6. The interface circuit of claim 5,
wherein the first receiver receives a positive data signal of the first signal, and
wherein the second receiver receives a negative data signal of the first signal.

7. The interface circuit of claim 6, wherein the control logic receives the positive data signal of the first signal and the negative data signal of the first signal, and controls the second switch to connect or disconnect the second termination resistor between the second transfer pads based on the positive data signal of the first signal and the negative data signal of the first signal.

8. An interface circuit including a first transmission circuit for transmitting a differential signal to a transmission line via first transfer pads, the interface circuit comprising:
transmitters configured to output the differential signal;
a first termination resistor block included in the first transmission circuit and connected between the first transfer pads; and
a second termination resistor block included in a second transmission circuit and connected between second transfer pads,
wherein, during a first time period, the first transmission circuit is enabled to transmit data and output the differential signal in a first mode, and during the first time period, the second transmission circuit has a high output impedance, the second termination resistor block detects the differential signal and in response to the differential signal connects a second unit resistor between the second transfer pads such that during a second time period after the first time period, the output impedance of the second transmission circuit has a designated impedance,
wherein, during the second time period, the first transmission circuit outputs data in a second mode, and the second termination resistor block performs impedance matching on the data output from the first transmission circuit, and
wherein the first mode is a mode in which less power is consumed compared to the second mode, and the second mode is a mode in which data is transmitted at a faster speed compared to the first mode.

9. The interface circuit of claim 8, wherein the first termination resistor block electrically connects or disconnects a first unit resistor between the first transfer pads in response to a signal sequence.

10. The interface circuit of claim 9, wherein the first termination resistor block electrically connects the first unit resistor between the first transfer pads by detecting that an operation mode of the second transmission circuit is switched from the first mode to the second mode.

11. The interface circuit of claim 9, wherein the first termination resistor block disconnects the first unit resistor between the first transfer pads by detecting that an operation mode of the second transmission circuit is switched from the second mode to the first mode.

12. The interface circuit of claim 8, wherein the first termination resistor block includes:
- a termination circuit connected to the first transfer pads and including a first unit resistor and a first unit switch device connected to each other in series;
- a first receiver including an input terminal connected to one of the first transfer pads;
- a second receiver including an input terminal connected to the other one of the first transfer pads; and
- a control logic connected to an output terminal of the first receiver and an output terminal of the second receiver.

13. The interface circuit of claim 8, wherein the first termination resistor block includes:
- a termination circuit including unit switch devices connected to the first transfer pads and connected to each other in series, and unit resistors connected to each other in series between the unit switch devices;
- a first receiver including an input terminal connected to one of the first transfer pads;
- a second receiver including an input terminal connected to the other one of the first transfer pads; and
- a control logic connected to an output terminal of the first receiver and an output terminal of the second receiver.

14. The interface circuit of claim 8, wherein the first termination resistor block includes:
- a termination circuit including unit switch devices connected to the first transfer pads and connected to each other in series, and unit resistors connected to each other in series between the unit switch devices;
- a common mode capacitor connected to the termination circuit;
- a first receiver including an input terminal connected to one of the first transfer pads;
- a second receiver including an input terminal connected to the other one of the first transfer pads; and
- a control logic connected to an output terminal of the first receiver and an output terminal of the second receiver.

15. An interface circuit including a first transmission circuit for transmitting a signal to a transmission line via transfer pads and a second transmission circuit connected to the transmission line, the interface circuit comprising:
- transmitters configured to output the signal; and
- a termination resistor block connected between the transfer pads,
- wherein, when the second transmission circuit connected to the transmission line is in a first mode and is enabled to transmit data in a first time period, an output impedance of a first transmission circuit has a high impedance, and during a second time period after the first time period, the termination resistor block detects a signal sequence output via the second transmission circuit and in response to the detected signal sequence connects a unit resistor between the transfer pads, such that during the second time period an output impedance of the second transmission circuit has a designated impedance different from the high impedance,
- wherein, during the second time period, the first transmission circuit outputs data in a second mode, and the termination resistor block performs impedance matching on the data output from the first transmission circuit, and
- wherein the first mode is a mode in which less power is consumed compared to the second mode, and the second mode is a mode in which data is transmitted at a faster speed compared to the first mode.

16. The interface circuit of claim 15, wherein the termination resistor block includes:
- a termination circuit connected to the transfer pads and including a unit resistor and a unit switch device connected to each other in series;
- a first receiver including an input terminal connected to one of the transfer pads;
- a second receiver including an input terminal connected to the other one of the transfer pads; and
- a control logic connected to an output terminal of the first receiver and an output terminal of the second receiver.

17. The interface circuit of claim 16,
wherein the first receiver receives a positive data signal of the signal, and
wherein the second receiver receives a negative data signal of the signal.

18. The interface circuit of claim 17, wherein the control logic receives the positive data signal of the signal and the negative data signal of the signal, and controls the unit switch device to connect or disconnect the unit resistor between the transfer pads based on the positive data signal of the signal and the negative data signal of the signal.

19. The interface circuit of claim 16, wherein the designated impedance is a sum of a turn-on resistance of the unit switch device and a resistance value of the unit resistor.

* * * * *